United States Patent
Park et al.

(10) Patent No.: US 10,101,968 B2
(45) Date of Patent: Oct. 16, 2018

(54) RANDOM NUMBER GENERATORS AND METHODS OF GENERATING RANDOM NUMBERS USING ADJUSTABLE META-STABLE VOLTAGE

(71) Applicant: Samsung Electronics Co., Ltd., Suwon-si, Gyeonggi-do (KR)

(72) Inventors: Sang-Wook Park, Hwaseong-si (KR); Bohdan Karpinskyy, Suwon-si (KR); Yong Ki Lee, Yongin-si (KR); Yunhyeok Choi, Hwaseong-si (KR); Mijung Noh, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/634,276

(22) Filed: Jun. 27, 2017

(65) Prior Publication Data
US 2018/0143806 A1 May 24, 2018

(30) Foreign Application Priority Data
Nov. 24, 2016 (KR) .......................... 10-2016-0157442

(51) Int. Cl.
*G06F 7/58* (2006.01)
(52) U.S. Cl.
CPC .............. *G06F 7/582* (2013.01); *G06F 7/588* (2013.01)
(58) Field of Classification Search
CPC ............................................. G06F 7/58–7/588
(Continued)

(56) References Cited

U.S. PATENT DOCUMENTS 6,963,888 B2   11/2005   Weimerskirch
7,325,021 B2   1/2008   Hars
(Continued)

FOREIGN PATENT DOCUMENTS

JP   2013-182097 A   9/2013
KR   20140110142 A   9/2014
KR   10-1481572 B1   1/2015

OTHER PUBLICATIONS

V. Suresh, "On-chip True Random Number Generation in Nanometer CMOS", Diss. University of Massachusetts Amherst, 2012.*
(Continued)

*Primary Examiner* — Matthew Sandifer
(74) *Attorney, Agent, or Firm* — Harness, Dickey & Pierce, PLC

(57) ABSTRACT

A random number generator may include a first meta-stable inverter having an input terminal and an output terminal connected to each other and configured to generate a meta-stable voltage, an amplifier configured to amplify the meta-stable voltage, control circuitry configured to adjust a threshold voltage of the meta-stable voltage, and a sampler configured to generate a random number based on sampling the meta-stable voltage. The random number generator may be configured to be operated according to different modes of operation of a plurality of modes of operation. The amplifier may be a second meta-stable inverter configured to amplify the meta-stable voltage or include an input terminal and an output terminal that are connected to each other based on the random number generator being operated according to a first mode of operation or a second mode of operation, respectively, of the plurality of modes of operation.

20 Claims, 22 Drawing Sheets

(58) Field of Classification Search
USPC .................................................. 708/250–256
See application file for complete search history.

(56) References Cited

U.S. PATENT DOCUMENTS

| | | | |
|---|---|---|---|
| 8,150,900 B2 | 4/2012 | Golic | |
| 8,341,201 B2 | 12/2012 | Vasyltsov et al. | |
| 8,522,065 B2 | 8/2013 | Regev et al. | |
| 8,527,567 B2 | 9/2013 | Vasyltsov et al. | |
| 8,650,233 B2 | 2/2014 | Ikegami et al. | |
| 9,047,152 B2 | 6/2015 | Chu | |
| 9,377,997 B2 | 6/2016 | Vasyltsov et al. | |
| 9,405,510 B2 | 8/2016 | Karpinskyy et al. | |
| 9,557,964 B2 | 1/2017 | Lee | |
| 2004/0019617 A1* | 1/2004 | Hars | G06F 7/588 708/250 |
| 2008/0091755 A1* | 4/2008 | Mudge | G06F 7/588 708/250 |
| 2010/0201419 A1* | 8/2010 | Vasyltsov | G06F 7/588 327/164 |
| 2011/0302232 A1* | 12/2011 | Vasyltsov | G06F 7/588 708/251 |
| 2012/0278372 A1 | 11/2012 | Gribok et al. | |
| 2015/0106415 A1 | 4/2015 | Mei et al. | |
| 2016/0210121 A1 | 7/2016 | Gammel et al. | |

OTHER PUBLICATIONS

V. Suresh, W. Burleson, "Entropy extraction in metastability-based TRNG", Proc. IEEE Int. Symp. Hardware-Oriented Security Trust (HOST), pp. 135-140, 2010.*

C. Tokunaga, D. Blaauw, T. Mudge, "True random number generator with a metastability-based quality control", J. Solid-State Circuits, vol. 43, No. 1, pp. 404-611, 2008.*

S. Srinivasan, S. Mathew, V. Erraguntla, R. Krishnamurthy, "A 4gbps 0.57pj/bit process-voltage-temperature variation tolerant all-digital true random number generator in 45 nm cmos", Proc. 22nd International Conference on VLSI Design, 2009.*

* cited by examiner

RANDOM NUMBER GENERATORS AND METHODS OF GENERATING RANDOM NUMBERS USING ADJUSTABLE META-STABLE VOLTAGE

CROSS-REFERENCE TO RELATED APPLICATIONS

This U.S. non-provisional patent application claims priority under 35 U.S.C. § 119 to Korean Patent Application No. 10-2016-0157442 filed Nov. 24, 2016, in the Korean Intellectual Property Office, the entire contents of which are hereby incorporated by reference.

BACKGROUND

Embodiments of the inventive concepts disclosed herein relate to random number generators, and more particularly, to random number generators using an adjustable meta-stable voltage.

As information communication technologies develop, the encryption of information is very important to maintain security of information. A random number is used, in general, to encrypt information, and thus, a random number generator for the generation of the random number is required. To make decryption of encrypted information difficult, a random number should not be regular, and a specific value (e.g., "0" or "1") should not be continuously output by a uniform length or longer.

In general, in the case of a random number generator that uses a ring-oscillator circuit, there is a considerable time to accumulate jitter, and thus, a speed at which a random number is generated is limited. In contrast, in the case of a random number generator that uses meta-stability, a speed at which a random number is generated is fast, but the quality of random number decreases due to mismatch between a meta-stable inverter and an amplifier or between meta-stable inverters.

Accordingly, to encrypt information quickly and to protect the information, there is a need to develop a random number generator that improves a speed, at which a random number is generated, and quickly generates the random number.

SUMMARY

Example embodiments of the inventive concepts provide a device and a method for generating a random number by using an adjustable meta-stable voltage.

According to some example embodiments, a random number generator may be configured to be operated according to different modes of operation of a plurality of modes of operation. The random number generator may include a first meta-stable inverter, a second meta-stable inverter, a control circuitry, and a sampler. The first meta-stable inverter may include an input terminal and an output terminal connected to each other. The first meta-stable inverter may be configured to generate a meta-stable voltage. The second meta-stable inverter may be configured to amplify the meta-stable voltage or include an input terminal and an output terminal that are connected to each other based on the random number generator being operated according to a first mode of operation or a second mode of operation, respectively, of the plurality of modes of operation. The control circuitry may be configured to adjust at least one voltage of a threshold voltage associated with the first meta-stable inverter and a common mode input voltage associated with the second meta-stable inverter. The meta-stable voltage may be based on the threshold voltage and the common mode input voltage. The sampler may be configured to generate a random number based on sampling the meta-stable voltage.

According to some example embodiments, a random number generator may include a meta-stable inverter, an amplifier, control circuitry, and a sampler. The meta-stable inverter may include an input terminal and an output terminal connected to each other. The meta-stable inverter may be configured to generate a meta-stable voltage. The amplifier may be configured to amplify the meta-stable voltage. The control circuitry may be configured to adjust a threshold voltage of the meta-stable voltage. The threshold voltage of the meta-stable voltage may be a base of the meta-stable voltage. The sampler may be configured to generate a random number based on sampling the meta-stable voltage.

According to some example embodiments, a method of generating a random number may include outputting a meta-stable voltage from a first meta-stable inverter, the first meta-stable inverter including an input terminal and an output terminal connected to each other. The method may include amplifying the meta-stable voltage based on using a second meta-stable inverter and generating a random number based on sampling the amplified meta-stable voltage. The meta-stable voltage may be based on a threshold voltage of the first meta-stable inverter and a common mode input voltage of the second meta-stable inverter. At least one voltage of the threshold voltage and the common mode input voltage may be adjustable.

According to some example embodiments, a random number generator may include a memory storing a program of instructions and a processor. The processor may be configured to execute the program of instructions to adjust a threshold voltage of a first meta-stable voltage that is output by a first meta-stable inverter, the meta-stable voltage based on at least the threshold voltage, and generate a random number based on sampling the meta-stable voltage.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION

Below, example embodiments of the inventive concepts may be described in detail and clearly to such an extent that an ordinary one in the art easily implements the inventive concepts.

Figure 1:
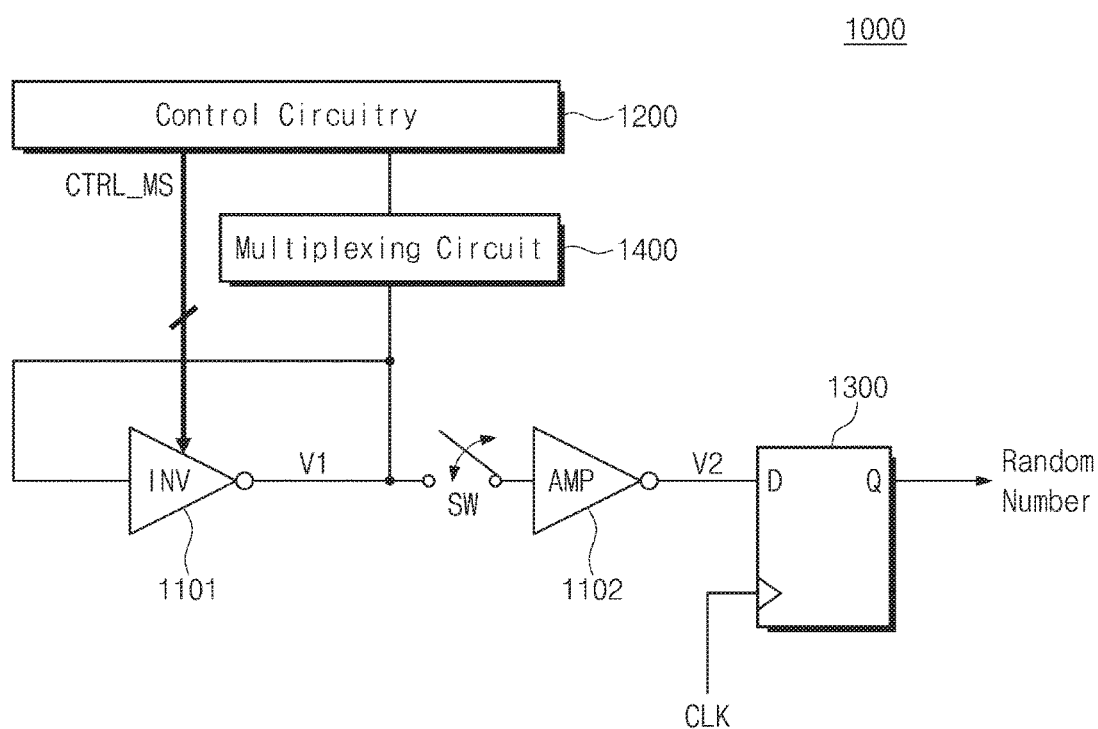
FIG. 1 is a block diagram illustrating a random number generator, according to some example embodiments of the inventive concepts.

FIG. 1 is a block diagram illustrating a random number generator 1000, according to some example embodiments of the inventive concepts. The random number generator 1000 may include a meta-stable inverter 1101, an amplifier 1102, a control circuitry 1200, and a sampler 1300. The random number generator 1000 may further include a multiplexing circuit 1400 and a switch SW.

The meta-stable inverter 1101 (also referred to herein as a "first meta-stable inverter") may be configured to generate a meta-stable voltage V1. The meta-stable inverter 1101 may include at least one diode-connected PMOS transistor and at least one diode-connected NMOS transistor. In some example embodiments, the meta-stable voltage V1 generated by the meta-stable inverter 1101 may be determined according to ("may be based at least in part upon") a ratio of a resistance value of the diode-connected PMOS transistor to a resistance value of the diode-connected NMOS transistor. For example, if and/or when the meta-stable inverter 1101 includes a plurality of diode-connected PMOS transistors and diode-connected NMOS transistors, the meta-stable inverter 1101 may further include appropriate switching elements that operate the transistors independently.

The amplifier 1102 may amplify the meta-stable voltage V1 output from ("generated by") the meta-stable inverter 1101 to output ("generate") an amplified voltage V2. For example, a configuration of the amplifier 1102 may be the same as a configuration of the meta-stable inverter 1101. In some example embodiments, the configuration of the amplifier 1102 may not be limited thereto. The amplifier 1102 may be variously configured to amplify the meta-stable voltage V1 that oscillates with a relatively small amplitude (e.g., an amplitude that is less than a particular threshold oscillation amplitude).

The control circuitry 1200 may be configured to adjust the meta-stable voltage V1 output from the meta-stable inverter 1101. For example, the control circuitry 1200 may generate a meta-stable control signal CTRL_MS for controlling the meta-stable inverter 1101. For example, the meta-stable control signal CTRL_MS may control the diode-connected PMOS transistors and the diode-connected NMOS transistors of the meta-stable inverter 1101 independently. Accordingly, it may be possible to generate the meta-stable voltage V1 of a desired level. The control circuitry 1200, in some example embodiments, may be implemented by a processor ("processing circuitry") executing a program of instructions stored on a memory ("non-transitory computer readable storage medium").

The sampler 1300 may generate a random number based on the amplified voltage V2 and a sampling clock CLK. For example, the sampler 1300 may sample the amplified voltage V2 that is input in synchronization with the sampling clock CLK. A flip-flop may be used as an example of the sampler 1300. In some example embodiments, the sampler 1300 may be implemented by a processor executing a program of instructions stored at a memory. The processor may be included in the control circuitry 1200. However, embodiments of the inventive concepts may not be limited thereto. As well as the flip-flop, various logic elements (circuitry) for performing a sampling operation may be used.

The multiplexing circuit 1400 and the switch SW may be switched on or off appropriately to generate a random number by controlling the meta-stable inverter 1101. For example, if and/or when the random number generator 1000 operates according to a first mode (or an amplification mode, first mode of operation, etc.), the multiplexing circuit 1400 may be switched off to allow ("enable") the control circuitry 1200 to fail to detect the meta-stable voltage V1. In the first mode ("if and/or when the random number generator 100 is operated according to the first mode of operation"), the switch SW may be switched on to allow the amplifier 1102 to amplify the meta-stable voltage V1. In contrast, in a second mode ("if and/or when the random number generator 1000 operates according to a second mode (or a detection mode, sensing mode, second mode of operation, etc.)", the multiplexing circuit 1400 may be switched on to allow the control circuitry 1200 to detect the meta-stable voltage V1. In the second mode, the switch SW may be switched off to allow the meta-stable voltage V1 not to be transferred to the amplifier 1102.

Figure 2:
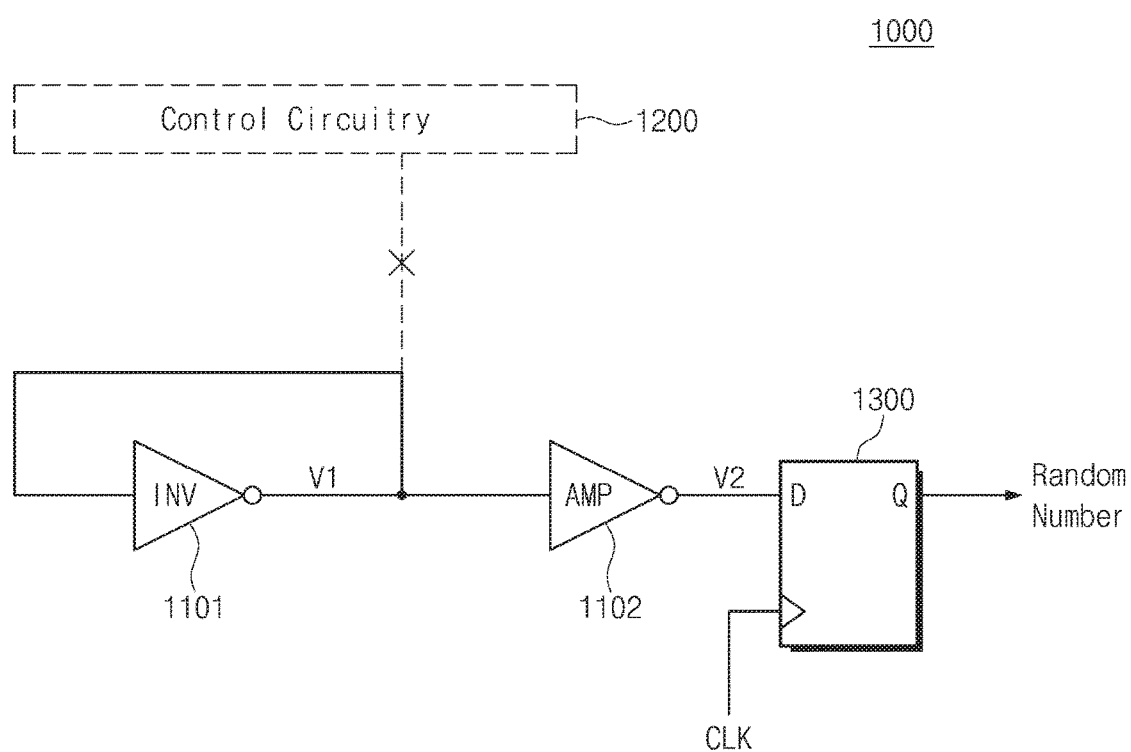
FIG. 2 is a block diagram illustrating an operation of the random number generator in a first mode, according to some example embodiments of the inventive concepts.
Figure 3:
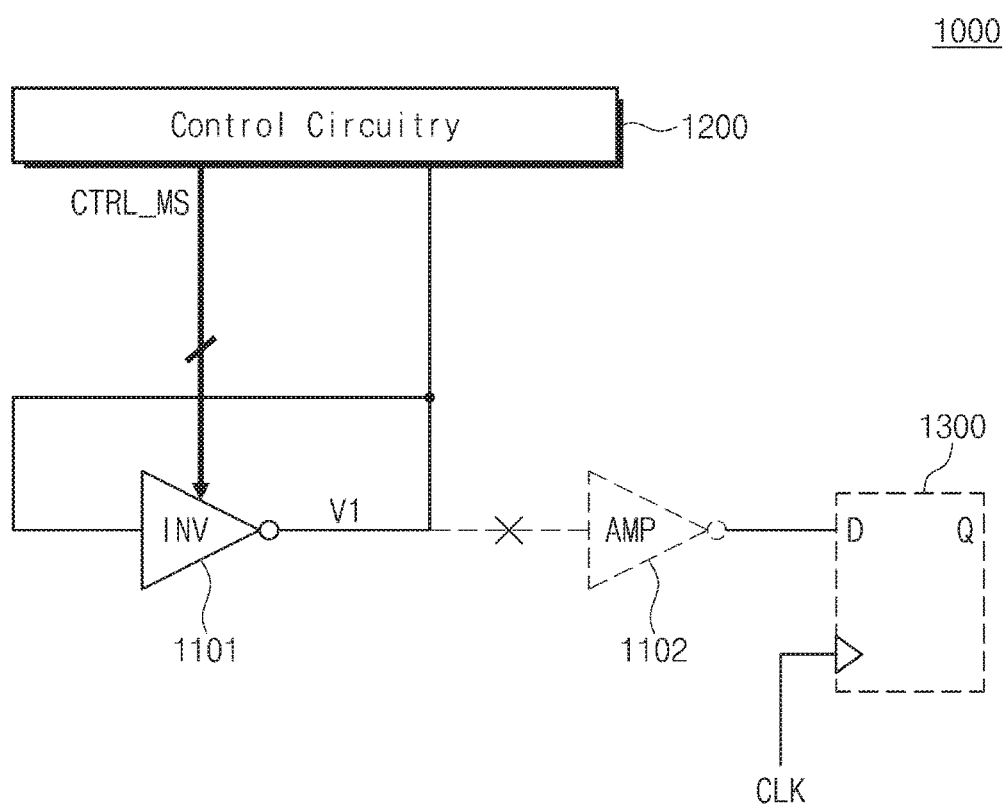
FIG. 3 is a block diagram illustrating an operation of the random number generator in a second mode, according to some example embodiments of the inventive concepts.

According to some example embodiments of the inventive concepts, the random number generator 1000 may operate according to various modes of operation ("modes")

to limit and/or prevent a random number from the sampler 1300 to be stuck to one bit "0" or "1". For example, the random number generator 1000 may generate a random number in the first mode and may adjust or tune the meta-stable inverter 1101 in the second mode. Some modes of operation of the random number generator 1000 are illustrated in FIGS. 2 and 3. By limiting and/or preventing a random number from the sampler 1300 from being stuck to one bit "0" or "1," the random number generator 1000 may generate a random number at an improved speed, thereby enabling improved speed at which information may be encrypted, thereby improving protection of such information. Accordingly, the random number generator 1000 addresses a problem of insufficiently quick information ("data") encryption.

FIG. 2 is a block diagram illustrating an operation of the random number generator 1000 in a first mode, according to some example embodiments of the inventive concepts. For ease of understanding, a description will be given with reference to FIG. 1.

In the first mode, the meta-stable inverter 1101 may generate the meta-stable voltage V1. As shown in FIG. 2, in the first mode, an input terminal and an output terminal of the meta-stable inverter 1101 are connected to each other. As a result, the meta-stable voltage V1 that includes noises of a diode-connected PMOS transistor and a diode-connected NMOS transistor may be generated, by the meta-stable inverter 1101, with respect to a specific ("particular") level ("magnitude") of voltage (hereinafter referred to as a "threshold voltage") that is output based on a resistance ratio of the PMOS and NMOS transistors. Afterwards, the amplifier 1102 may amplify the meta-stable voltage V1, and the sampler 1300 may sample the amplified voltage V2 and may generate a random number.

In some example embodiments, if and/or when the meta-stable inverter 1101 and the amplifier 1102 are matched, that is, if a voltage level (i.e., the threshold voltage) that corresponds to the center of vibration of the meta-stable voltage V1 is the same as a level of a common mode input voltage of the amplifier 1102, a random number output from the sampler 1300 may include bits "0" and/or "1" that are arranged randomly.

In some example embodiments, a level ("magnitude") difference between the threshold voltage of the meta-stable inverter 1101 and the common mode input voltage of the amplifier 1102 may be different from any threshold value. In this case, a random number output from the sampler 1300 may be stuck to "0" or "1". That is, to generate a high-quality random number, there is a need to adjust or tune the meta-stable inverter 1101 such that a random number is not stuck to "0" or "1".

FIG. 3 is a block diagram illustrating an operation of the random number generator 1000 in a second mode, according to some example embodiments of the inventive concepts. For ease of understanding, a description will be given with reference to FIG. 1.

In the second mode, the control circuitry 1200 may detect a level ("magnitude") of a threshold voltage of the meta-stable inverter 1101. To this end, the multiplexing circuit 1400 may perform a switching operation such that the meta-stable voltage V1 from the meta-stable inverter 1101 is transferred to the control circuitry 1200. For example, if and/or when the meta-stable voltage V1 oscillates between an upper limit and a lower limit of any specific value, a threshold voltage level of the meta-stable inverter 1101 may be approximately an intermediate value of an upper limit and a lower limit of the meta-stable voltage V1.

The control circuitry 1200 may match the meta-stable inverter 1101 and the amplifier 1102 so that the voltage V2 amplified from the meta-stable voltage V1 is not stuck. For example, the control circuitry 1200 may generate the meta-stable control signals CTRL_MS that are used to adjust or tune the meta-stable inverter 1101 such that the threshold voltage of the meta-stable inverter 1101 is the same voltage as the common mode input voltage of the amplifier 1102. For example, the meta-stable control signal CTRL_MS may include a plurality of control signals that cause the diode-connected PMOS transistors and the diode-connected NMOS transistors of the meta-stable inverter 1101 to be controlled independently.

In some example embodiments, the control circuitry 1200 may adjust the threshold voltage of the meta-stable inverter 1101 so that the common mode input voltage of the amplifier 1102 is between the upper limit and the lower limit of the meta-stable voltage V1. As will be described later in detail, threshold voltage of the meta-stable inverter 1101 may be adjusted by allowing some of PMOS transistors and NMOS transistors of the meta-stable inverter 1101 to operate.

If and/or when the threshold voltage of the meta-stable inverter 1101 is completely adjusted or tuned in the second mode, under control of the multiplexing circuit 1400, the output terminal of the meta-stable inverter 1101 and the control circuitry 1200 may be disconnected from each other, and the output terminal of the meta-stable inverter 1101 and the amplifier 1102 may be connected to each other. This may mean that the random number generator 1000 enters the first mode again.

Figure 4A:
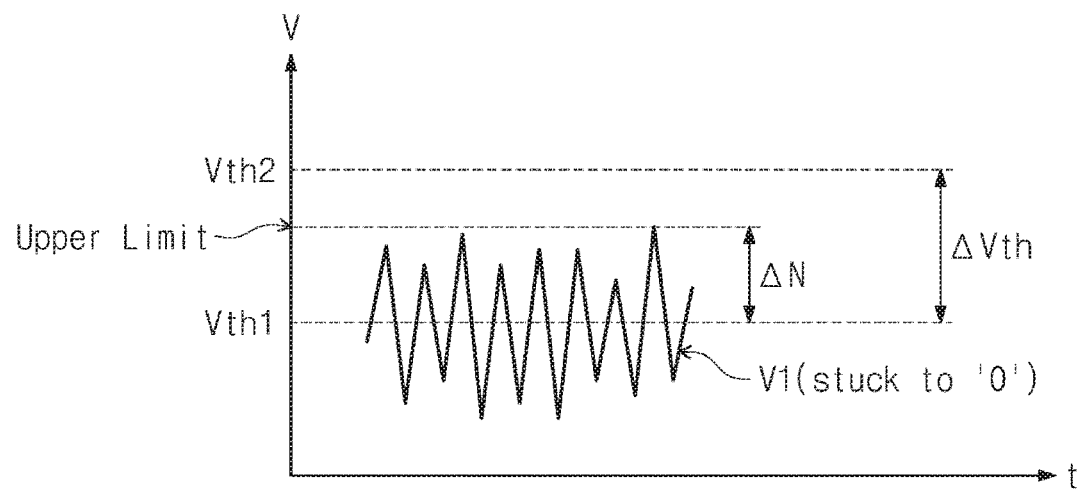
FIGS. 4A and 4B are graphs for showing a process of correcting a stuck random number by using a random number generator, according to some example embodiments of the inventive concepts.
Figure 4B:
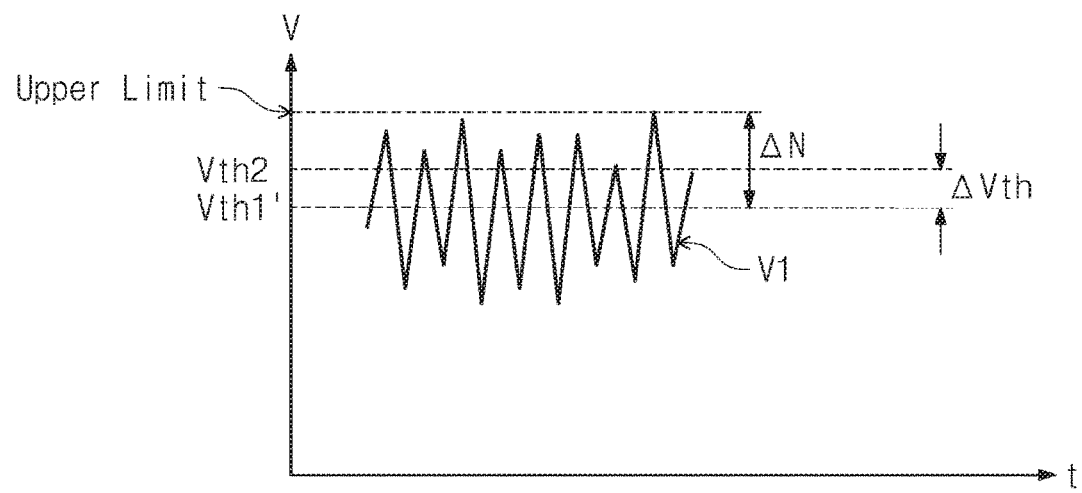

FIGS. 4A and 4B are graphs showing a process of correcting a stuck random number by using a random number generator, according to some example embodiments of the inventive concepts. For example, FIG. 4A illustrates the case where a random number output from a random number generator is stuck, and FIG. 4B illustrates the case where a stuck random number is corrected by using the random number generator. For ease of understanding, a description will be given with reference to FIGS. 1 to 3.

First, referring to FIG. 4A, the meta-stable voltage V1 output from the meta-stable inverter 1101 oscillates vertically with respect to a threshold voltage Vth1. It is assumed that the upper limit of the meta-stable voltage V1 is defined by a sum of the threshold voltage Vth1 and ΔN and the lower limit of the meta-stable voltage V1 is defined by a difference between the threshold voltage Vth1 and ΔN. That is, "ΔN" may be a difference between the upper limit of the meta-stable voltage V1 and the threshold voltage Vth1 or may be a difference between the threshold voltage Vth1 and the lower limit of the meta-stable voltage V1. It will be understood that an actual waveform of the meta-stable voltage V1 may be different from the illustration of FIG. 4A.

A random number may be stuck to "0" if the upper limit of the meta-stable voltage V1 is smaller than a common mode input voltage Vth2 of the amplifier 1102, as shown in FIG. 4A. That is, to generate a random number such that "0" and "1" are repeated irregularly, the upper limit of the meta-stable voltage V1 may be at least larger than the common mode input voltage Vth2 of the amplifier 1102.

A random number may be stuck to "0" or "1" based on various factors: the number of inverters that amplify the meta-stable voltage V1 and whether an inverter that amplifies the meta-stable voltage V1 is implemented with an inverting amplifier or a non-inverting amplifier. In some example embodiments, that a random number is stuck to "0"

only means that the random number is not generated normally, and a value of the random number may not be important.

Referring to FIG. 4B, the meta-stable voltage V1 that has an upper limit larger than the common mode input voltage Vth2 of the amplifier 1102 is generated by adjusting or tuning the meta-stable inverter 1101 in response to the meta-stable control signal CTRL_MS. In this case, a random number of "1" may be generated from the meta-stable voltage V1 larger in level than the common mode input voltage Vth2 (or "0" in an inverse case), and a random number of "0" may be generated from the meta-stable voltage V1 smaller in level than the common mode input voltage Vth2 (or "1" in an inverse case).

As described with reference to FIGS. 4A and 4B, to limit and/or prevent a random number from being stuck to one value, the upper limit of the meta-stable voltage V1 has to be at least larger than the common mode input voltage Vth2 of the amplifier 1102. That is, a difference ΔVth between the threshold voltage Vth1' of the meta-stable inverter 1101 and the common mode input voltage Vth2 has to be smaller than ΔN. In some example embodiments, a single quotation mark attached to the threshold voltage Vth1' indicates that a threshold voltage is adjusted or tuned by the meta-stable control signal CTRL_MS. For example, "ΔN" may be a difference between the upper limit of the meta-stable voltage V1 and the threshold voltage Vth1'. In some example embodiments, "ΔN" may correspond to half the amplitude of the meta-stable voltage V1.

Unlike FIG. 4A, a random number may be stuck to a specific value even when the common mode input voltage Vth2 of the amplifier 1102 is smaller than the threshold voltage Vth1' of the meta-stable inverter 1101. In this case, a random number may be stuck to a value that is contrary to that of FIG. 4A. This case is illustrated in FIGS. 5A and 5B as an example.

Figure 5A:
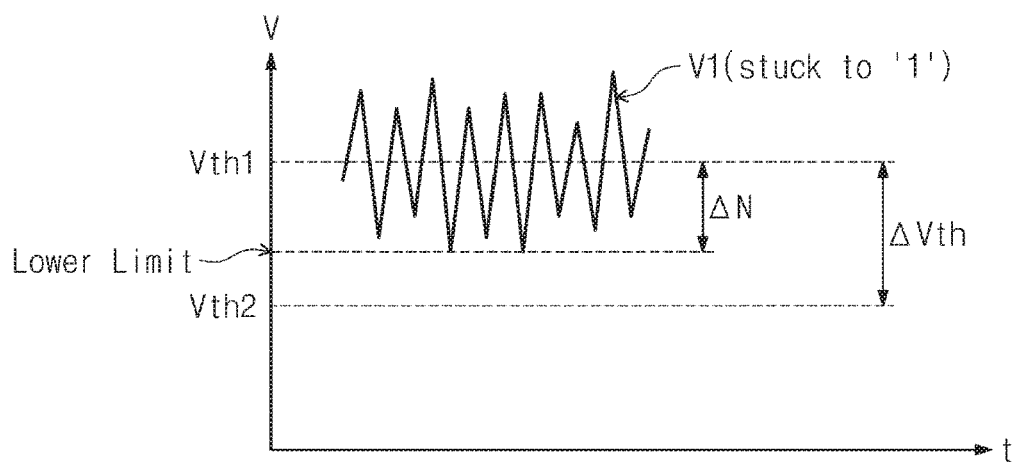
FIGS. 5A and 5B are graphs for showing a process of correcting a stuck random number by using a random number generator, according to some example embodiments of the inventive concepts.
Figure 5B:
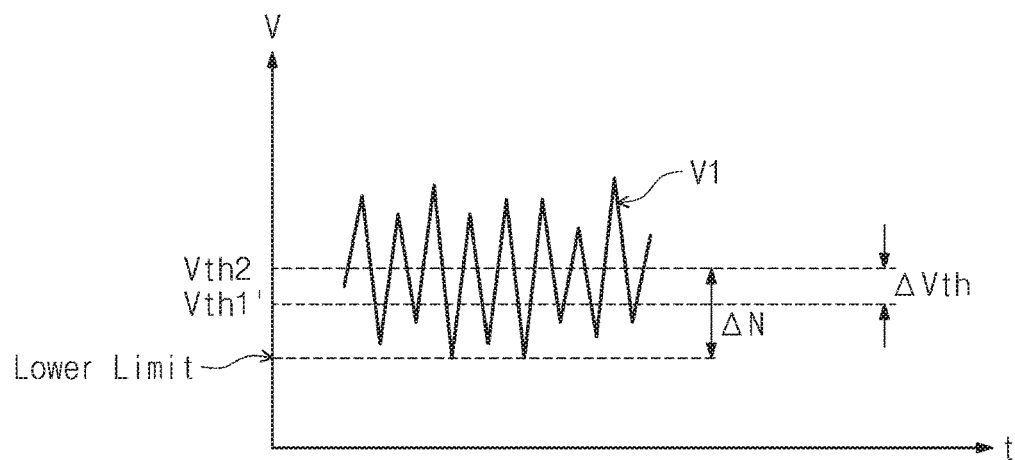

FIGS. 5A and 5B are graphs showing a process of correcting a stuck random number by using a random number generator, according to some example embodiments of the inventive concepts. In some example embodiments, FIGS. 5A and 5B are similar to FIGS. 4A and 4B, respectively, except a random number is stuck to a value that is contrary to that of FIG. 4A.

First, referring to FIG. 5A, the meta-stable voltage V1 output from the meta-stable inverter 1101 oscillates vertically with respect to the threshold voltage Vth1. A random number may be stuck to "1" if the lower limit of the meta-stable voltage V1 is larger than the common mode input voltage Vth2 of the amplifier 1102. That is, to generate a random number such that "0" and "1" are repeated irregularly, the lower limit of the meta-stable voltage V1 may be at least smaller than the common mode input voltage Vth2 of the amplifier 1102.

Referring to FIG. 5B, the meta-stable voltage V1 that has a lower limit smaller than the common mode input voltage Vth2 of the amplifier 1102 is generated by adjusting or tuning the meta-stable inverter 1101 in response to the meta-stable control signal CTRL_MS. In this case, a random number of "1" may be generated from the meta-stable voltage V1 larger in level than the common mode input voltage Vth2 (or "0" in an inverse case), and a random number of "0" may be generated from the meta-stable voltage V1 smaller in level than the common mode input voltage Vth2 (or "1" in an inverse case).

As described with reference to FIGS. 5A and 5B, to limit and/or prevent a random number from being stuck to one value, the lower limit of the meta-stable voltage V1 has to be smaller than the common mode input voltage Vth2 of the amplifier 1102. That is, a difference ΔVth between the common mode input voltage Vth2 and the threshold voltage Vth1' of the meta-stable inverter 1101 has to be smaller than ΔN. In some example embodiments, a single quotation mark attached to the threshold voltage Vth1' indicates that a threshold voltage is adjusted or tuned by the meta-stable control signal CTRL_MS.

Further, as understood from FIGS. 4B and 5B, to limit and/or prevent a random number generated by a random number generator from being stuck to one value, the threshold voltage Vth1 of the meta-stable inverter 1101 may be adjusted or tuned such that the common mode input voltage Vth2 of the amplifier 1102 is between the upper and lower limits of the meta-stable voltage V1.

Figure 6A:
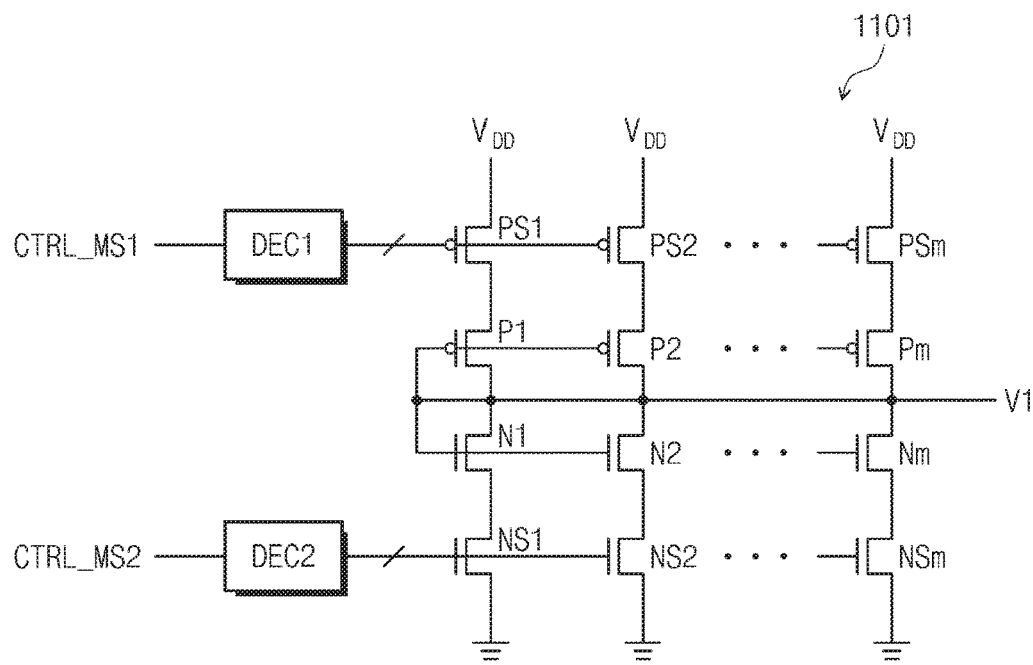
FIG. 6A is a drawing illustrating the meta-stable inverter illustrated in FIG. 1.

FIG. 6A is a drawing illustrating the meta-stable inverter 1101 illustrated in FIG. 1. For ease of understanding, a description will be given with reference to FIG. 1.

The meta-stable inverter 1101 may include a plurality of diode-connected PMOS transistors P1 to Pm and a plurality of diode-connected NMOS transistors N1 to Nm. As used herein, "m" may be an integer. As illustrated in FIG. 6A, the meta-stable voltage V1 may be generated in a state where drain terminals ("drain electrodes") of the PMOS transistors P1 to Pm are connected with drain terminals ("drain electrodes") of the NMOS transistors N1 to Nm.

The meta-stable inverter 1101 may further include switching transistors PS1 to PSm and NS1 to NSm that are configured to control the diode-connected PMOS transistors P1 to Pm and the diode-connected NMOS transistors N1 to Nm. For example, each of PMOS switching transistors PS1 to PSm may be connected between one end of the corresponding diode-connected PMOS transistor (e.g., a source electrode of the corresponding PMOS transistor) and a power supply voltage $V_{DD}$, and each of NMOS switching transistors NS1 to NSm may be connected between one end of the corresponding diode-connected PMOS transistor and a ground voltage.

The meta-stable inverter 1101 may further include a first decoder DEC1 that is configured to control the PMOS switching transistors PS1 to PSm independently and a second decoder DEC2 that is configured to control the NMOS switching transistors NS1 to NSm independently. The PMOS switching transistors PS1 to PSm may not be connected to each other. That is, gate electrodes of the PMOS switching transistors PS1 to PSm may be independently connected with the first decoder DEC1. Similarly, gate electrodes of the NMOS switching transistors NS1 to NSm may be independently connected with the second decoder DEC2.

The first decoder DEC and the second decoder DEC2 may be respectively controlled by a first meta-stable control signal CTRL_MS1 and a second meta-stable control signal CTRL_MS2. The meta-stable voltage V1 of a desired level, in detail, a threshold voltage of a desired level, may be generated by independently turning on or off the switching transistors PS1 to PSm and NS1 to NSm by the meta-stable control signals CTRL_MS and CTRL_MS2. This is illustrated in FIG. 6B.

Figure 6B:
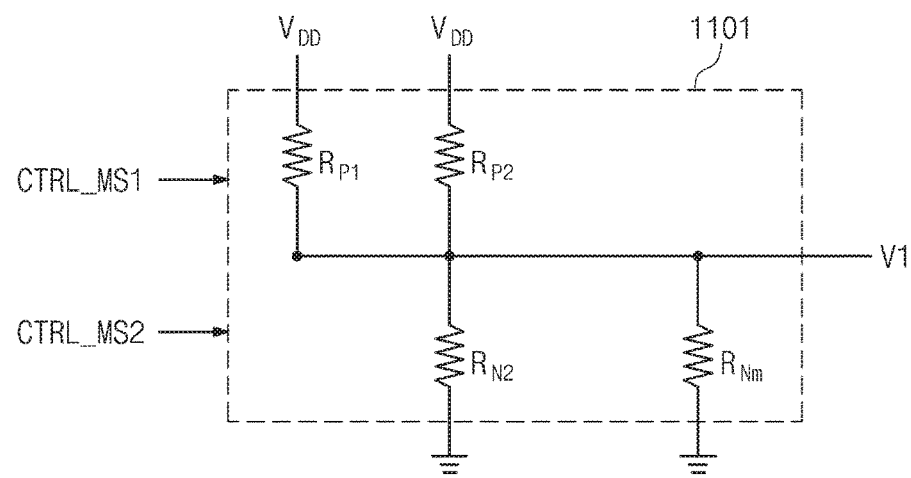
FIG. 6B is a drawing an example of a meta-stable inverter that is adjusted or tuned to generate a meta-stable voltage of a desired level.

FIG. 6B is a drawing illustrating an example of a meta-stable inverter 1101 that is configured to be adjusted or tuned to generate a meta-stable voltage of a desired level ("magnitude"). In some example embodiments, it is assumed that the first and second PMOS switching transistors PS1 and PS2 are turned on by the first meta-stable control signal CTRL_MS1 and the second and m-th NMOS switching transistors NS2 and NSm are turned on by the second meta-stable control signal CTRL_MS2.

In this case, the meta-stable inverter 1101 may be modeled as illustrated in FIG. 6B. Resistors $R_{P1}$ and $P_{P2}$ may respectively correspond to resistances of the PMOS transistors P1 and P2, and resistors $R_{N2}$ and $P_{Nm}$ may respectively correspond to resistances of the NMOS transistors N2 and Nm. According to a voltage division rule, the meta-stable voltage V1 may be expressed by multiplying the power supply voltage $V_{DD}$ to a ratio of resistors $R_{P1}$ and $P_{R2}$ and the resistors $R_{N2}$ and $P_{Nm}$. Due to parasitic components of the PMOS and NMOS transistors P1, P2, N2, and Nm, the meta-stable voltage V1 may have a noise that vertically oscillates with respect to the threshold voltage Vth1.

In some example embodiments, since the meta-stable inverter 1101 includes "m" PMOS transistors P1 to Pm and "m" NMOS transistors N1 to Nm, the meta-stable voltage V1 having a "m by m" bit resolution may be generated. In some example embodiments, the number "m" of transistors may be variously determined in consideration of specifications of a system to which the random number generator 1000 is applied, a chip area, costs, etc.

Figure 7:
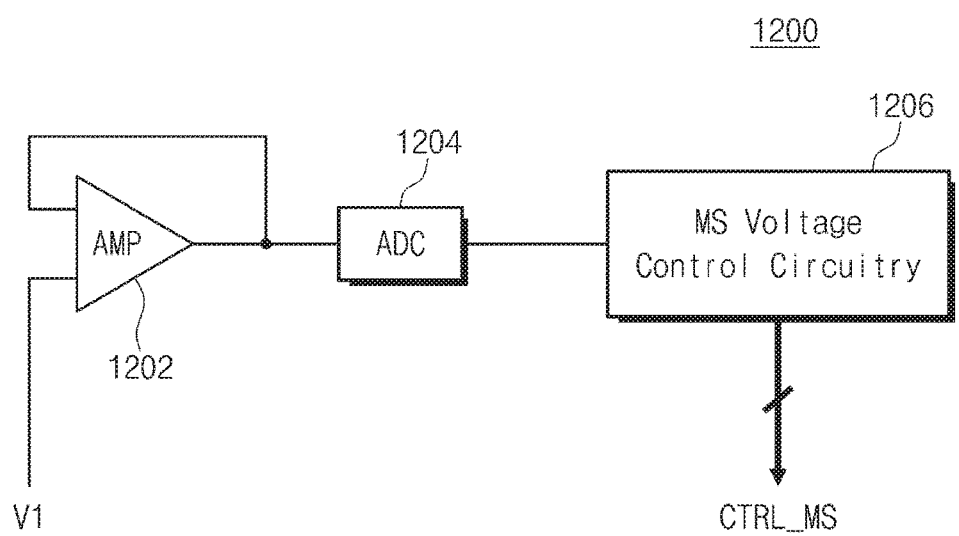
FIG. 7 is a block diagram illustrating a configuration of a control circuitry illustrated in FIG. 1.

FIG. 7 is a block diagram illustrating a configuration of the control circuitry 1200 illustrated in FIG. 1. For ease of understanding, a description will be given with reference to FIGS. 1 and 6A.

The control circuitry 1200 may include an amplifier 1202, an analog-to-digital converter 1204, and meta-stable voltage control circuitry 1206. The meta-stable voltage control circuitry 1206 may be implemented by a processor ("processing circuitry") executing a program of instructions stored at a memory.

The amplifier 1202 may receive and amplify the meta-stable voltage V1. For example, the amplifier 1202 may be implemented with a voltage follower.

The analog-to-digital converter 1204 may generate a digital value by converting an output voltage of the amplifier 1202. That is, an output of the analog-to-digital converter 1204 may correspond to a value of the digitized meta-stable voltage V1.

The meta-stable voltage control circuitry 1206 may determine whether there is a need to adjust or tune the meta-stable inverter 1101. For example, the meta-stable voltage control circuitry 1206 may in advance store a common mode input voltage of the amplifier 1102. In this case, the meta-stable voltage control circuitry 1206 determine whether there is a need to adjust or tune the meta-stable inverter 1101, by comparing the digitized meta-stable voltage and the common mode input voltage of the amplifier 1202 stored in advance.

If the comparison result indicates that the digitized meta-stable voltage is within a permissible range, there is no need to adjust the meta-stable inverter 1101. In some example embodiments, the permissible range may refer to a range that is defined by an upper limit and a lower limit of the meta-stable voltage V1 described with reference to FIGS. 4A to 5B.

If the comparison result indicates that the digitized meta-stable voltage gets out of the permissible range, the meta-stable voltage control circuitry may generate the meta-stable control signal CTRL_MS for adjusting a threshold voltage Vth1 (refer to FIG. 4A) of the meta-stable inverter 1101. The meta-stable control signal CTRL_MS may include signals for independently controlling the switching transistors PS1 to PSm and NS1 to NSm. An operation in which the threshold voltage Vth1 or the meta-stable voltage V1, which has a desired level, is generated when the switching transistors PS1 to PSm and NS1 to NSm are controlled by the meta-stable control signal CTRL_MS, and a detailed description thereof is thus omitted.

Figure 8:
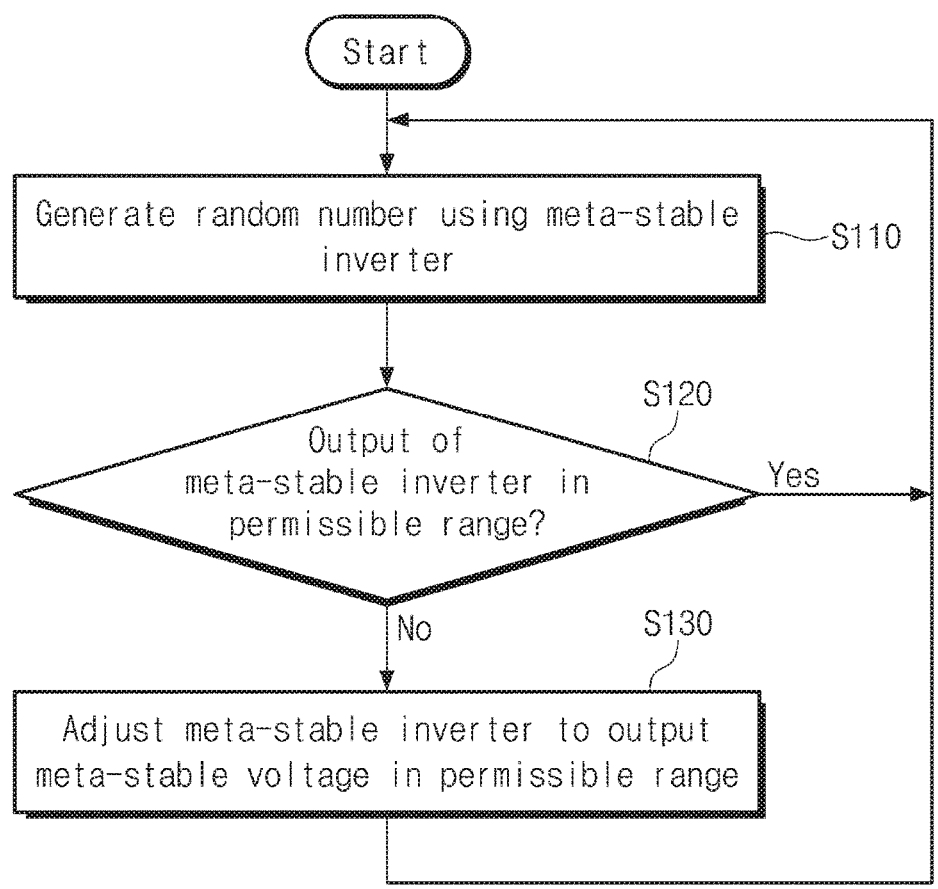
FIG. 8 is a flowchart illustrating an operating method of the random number generator, according to some example embodiments of the inventive concepts.

FIG. 8 is a flowchart illustrating an operating method of a random number generator, according to some example embodiments of the inventive concepts. For ease of understanding, a description will be given with reference to FIGS. 1 and 7.

In operation S110, a random number may be generated by using the meta-stable inverter 1101. For example, the amplifier 1102 and the sampler 1300 may be further used in addition to the meta-stable inverter 1101.

In operation S120, whether an output of the meta-stable inverter 1101, that is, the meta-stable voltage V1 is within a permissible range may be determined. In some example embodiments, the permissible range may refer to a range that is defined by an upper limit and a lower limit of the meta-stable voltage V1 described with reference to FIGS. 4A to 5B. The determination may be performed by the meta-stable voltage control circuitry 1206.

For example, operation S120 may be performed in real time or periodically. In some example embodiments, operation S120 may be performed when a random number is stuck to a specific value (i.e., "0" or "1"). In this case, the random number generator 1000 may further include a separate sensor that senses a stuck random number.

An operation branch may be made according to the determination result. If the meta-stable voltage V1 is within the permissible range, the process proceeds to operation S110 to continue to generate a random number. In contrast, if the meta-stable voltage V1 gets out of the permissible range, the process proceeds to operation S130.

In operation S130, the meta-stable inverter 1101 may be adjusted to generate a meta-stable voltage within the permissible range. For example, the adjustment may be made by independently controlling switching transistors that are connected with the diode-connected PMOS transistors and the diode-connected NMOS transistors of the meta-stable inverter 1101. If the adjusting or tuning of the meta-stable inverter 1101 is completed, the process proceeds to operation S110.

Although not illustrated in FIG. 8, according to some example embodiments of the inventive concepts, the random number generator 1000 may continue to generate a random number until a separate command or instruction is issued. For example, the command or instruction may be received from the outside (e.g., an electronic device in which a random number generator is included). For example, the instruction may be received in any one of operation S110 to operation S130; when an instruction to stop generating a random number is received, the generating of the random number may immediately stop.

An embodiment is described as the meta-stable inverter 1101 is adjusted after a random number is first generated. In some example embodiments, embodiments of the inventive concepts may not be limited thereto. For example, a random number may be generated after the meta-stable inverter 1101 is first adjusted or tuned.

Figure 9:
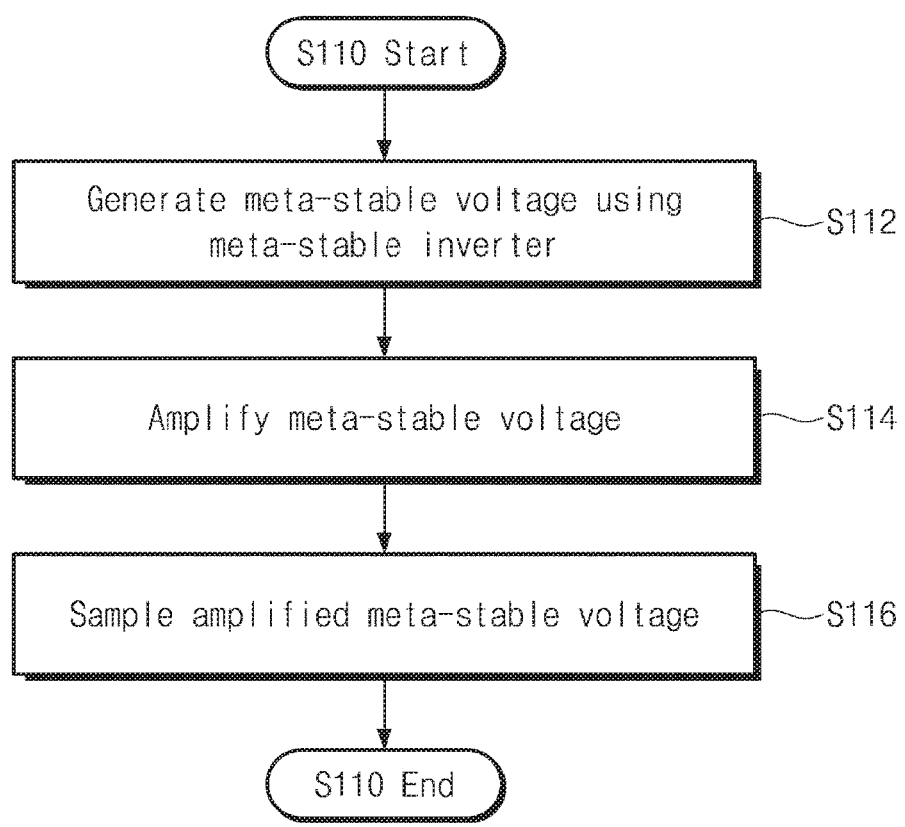
FIG. 9 is a flowchart illustrating operation S110 illustrated in FIG. 8 in detail.

FIG. 9 is a flowchart illustrating operation S110 illustrated in FIG. 8 in detail. For ease of understanding, a description will be given with reference to FIG. 1.

In operation S112, the meta-stable voltage V1 may be generated by using the meta-stable inverter 1101. A noise that vertically oscillates with respect to the threshold voltage Vth1 may be output from the meta-stable inverter 1101 based on a resistance ratio of the diode-connected PMOS transistors and the diode-connected NMOS transistors.

In operation S114, the meta-stable voltage V1 may be amplified by the amplifier 1102. A configuration of the amplifier 1102 may be the same as or similar to that of the meta-stable inverter 1101, but embodiments of the inventive concepts may not be limited thereto.

In operation S116, the amplified voltage that is input in synchronization with the sampling clock CLK may be sampled. A random number may be generated as the sampling result.

Figure 10:
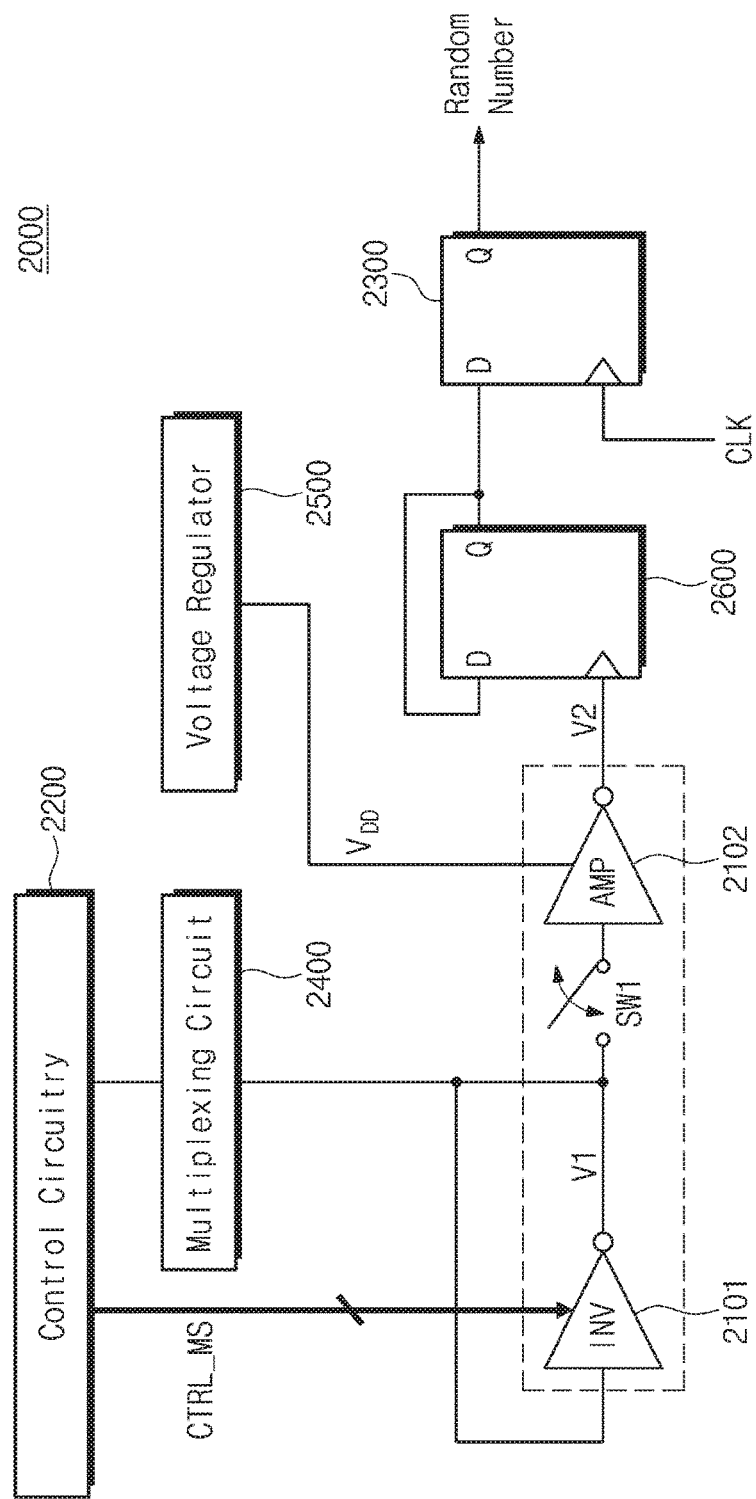
FIG. 10 is a block diagram illustrating a random number generator, according to some example embodiments of the inventive concepts.

FIG. 10 is a block diagram illustrating a random number generator 2000, according to some example embodiments of the inventive concepts. For ease of understanding, a description will be given with reference to FIG. 6A.

The random number generator 2000 may include a meta-stable inverter 2101, an amplifier 2102, a control circuitry 2200, a sampler 2300, a multiplexing circuit 2400, and a switch SW. The random number generator 2000 may further include a voltage regulator 2500 and a divider 2600. The random number generator 2000 is substantially the same (e.g., the same within manufacturing tolerances and/or material tolerances) as the random number generator 1000 of FIG. 1 except the random number generator 2000 further includes the voltage regulator 2500 and the divider 2600. Thus, a detailed description thereof may not be repeated here.

The voltage regulator 2500 may be configured to supply a stable voltage to the random number generator 2000. As described with reference to FIGS. 4A to 5B, a threshold voltage of the meta-stable inverter 2101 has to be within a permissible range. To this end, supplying a stable voltage to the meta-stable inverter 2101 (for example, $V_{DD}$ of FIG. 6A) may be needed. The reason is that if the power supply voltage $V_{DD}$ is unstable, the meta-stable voltage V1 output from the meta-stable inverter 2101, in detail, a threshold voltage gets out of a permissible range.

For example, the power supply voltage $V_{DD}$ generated by the voltage regulator 2500 may be provided to source terminals of the PMOS switching transistors PS1 to PSm of the meta-stable inverter 2101. The power supply terminal $V_{DD}$ may be provided to drive the amplifier 2102.

The divider 2600 may be provided to make it easy to sample a noise (i.e., a meta-stable voltage) that oscillates at high speed. For example, a flip-flop may be used as an example of the divider 2600. In this case, the flip-flop may operate as a divider by connecting an input "D" and an output "Q" of the flip-flop. In some example embodiments, a configuration of the divider 2600 may not be limited thereto, and various logic elements may be used as the divider 2600.

Figure 11:
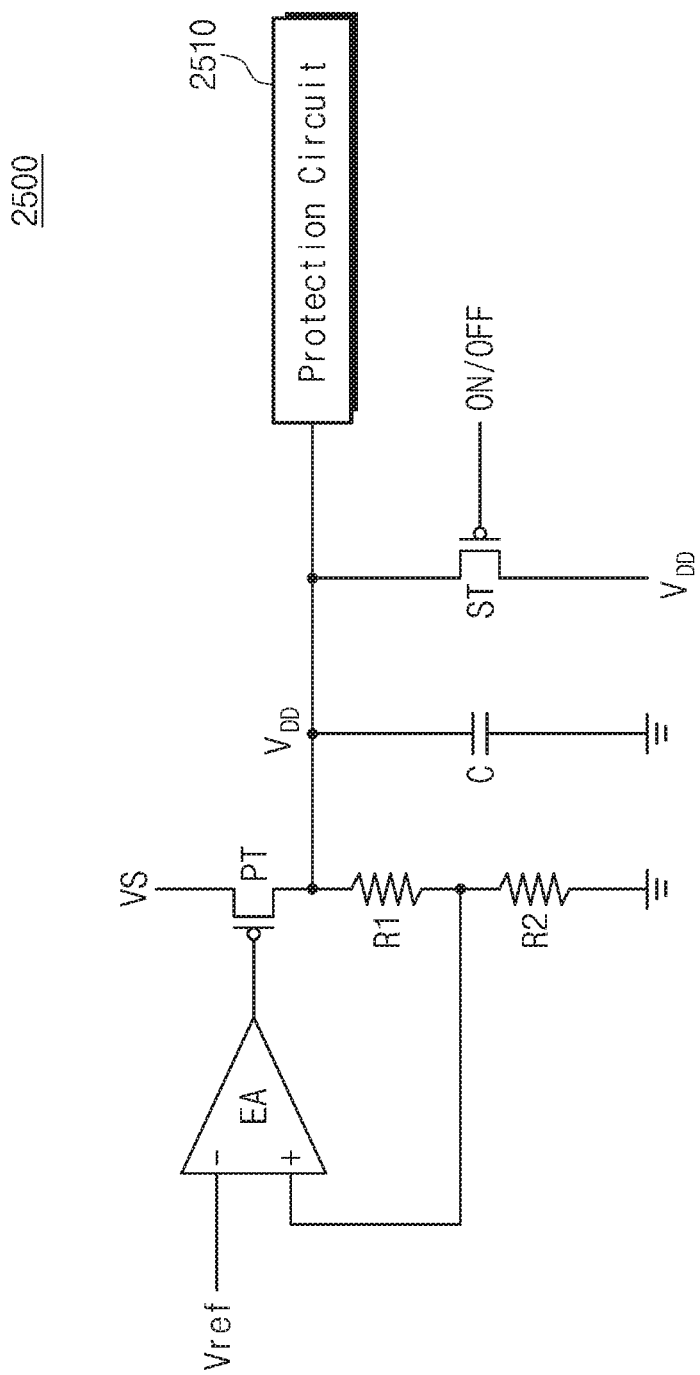
FIG. 11 is block diagram illustrating a voltage regulator illustrated in FIG. 10.

FIG. 11 is a block diagram illustrating the voltage regulator 2500 illustrated in FIG. 10. For example, the voltage regulator 2500 may be a linear regulator such as a low dropout (LDO) regulator. In some example embodiments, embodiments of the inventive concepts may not be limited thereto. For example, regulators of various configurations may be used to stably drive the meta-stable inverter 2101 and/or the amplifier 2102.

The voltage regulator 2500 may include an error amplifier EA, first and second resistors R1 and R2, a pass transistor PT, a switching transistor ST, a stabilization capacitor C, and a protection circuit 2510.

A reference voltage Vref may be applied to a first input terminal of the error amplifier EA. An output terminal of the error amplifier EA may be connected to a gate electrode of the pass transistor PT. A voltage VS from the outside may be applied to a source terminal of the pass transistor PT, and the power supply voltage $V_{DD}$ may be output through a drain terminal of the pass transistor PT. The first resistor R1 may be connected between a second input terminal of the error amplifier EA and the drain terminal of the pass transistor PT, and the second resistor R2 may be connected between the second input terminal of the error amplifier EA and a ground.

The switching transistor ST may be configured to be turned on or off by an ON/OFF signal and to provide the power supply voltage $V_{DD}$ to the meta-stable inverter 2101 and/or the amplifier 2102 at desired timing. For example, the switching transistor ST may be turned on when the random number generator 2000 generates a random number or when the meta-stable inverter 2101 of the random number generator 2000 is adjusted or tuned.

The stabilization capacitor C may be connected between the drain terminal of the pass transistor PT and the ground. The stabilization capacitor C may limit and/or prevent the power supply voltage $V_{DD}$ from changing rapidly, and thus, the power supply voltage VDD may be stably supplied. According to some example embodiments, the stabilization capacitor C may not be provided.

The protection circuit 2510 may limit and/or prevent generation of the power supply voltage VDD getting out of a specific range. For example, the protection circuit 2510 may include an over voltage protection device that limits and/or prevents generation of a voltage exceeding a specific level and an under voltage protection device that limits and/or prevents generation of a voltage smaller than a specific level.

It will be understood that the configuration of the voltage regulator 2500 illustrated in FIG. 11 is only an example and is not limited thereto. For example, the voltage regulator 2500 may be variously changed to include a path transistor implemented with an NMOS transistor or to include a combination of an NMOS transistor and PMOS transistors.

Figure 12:
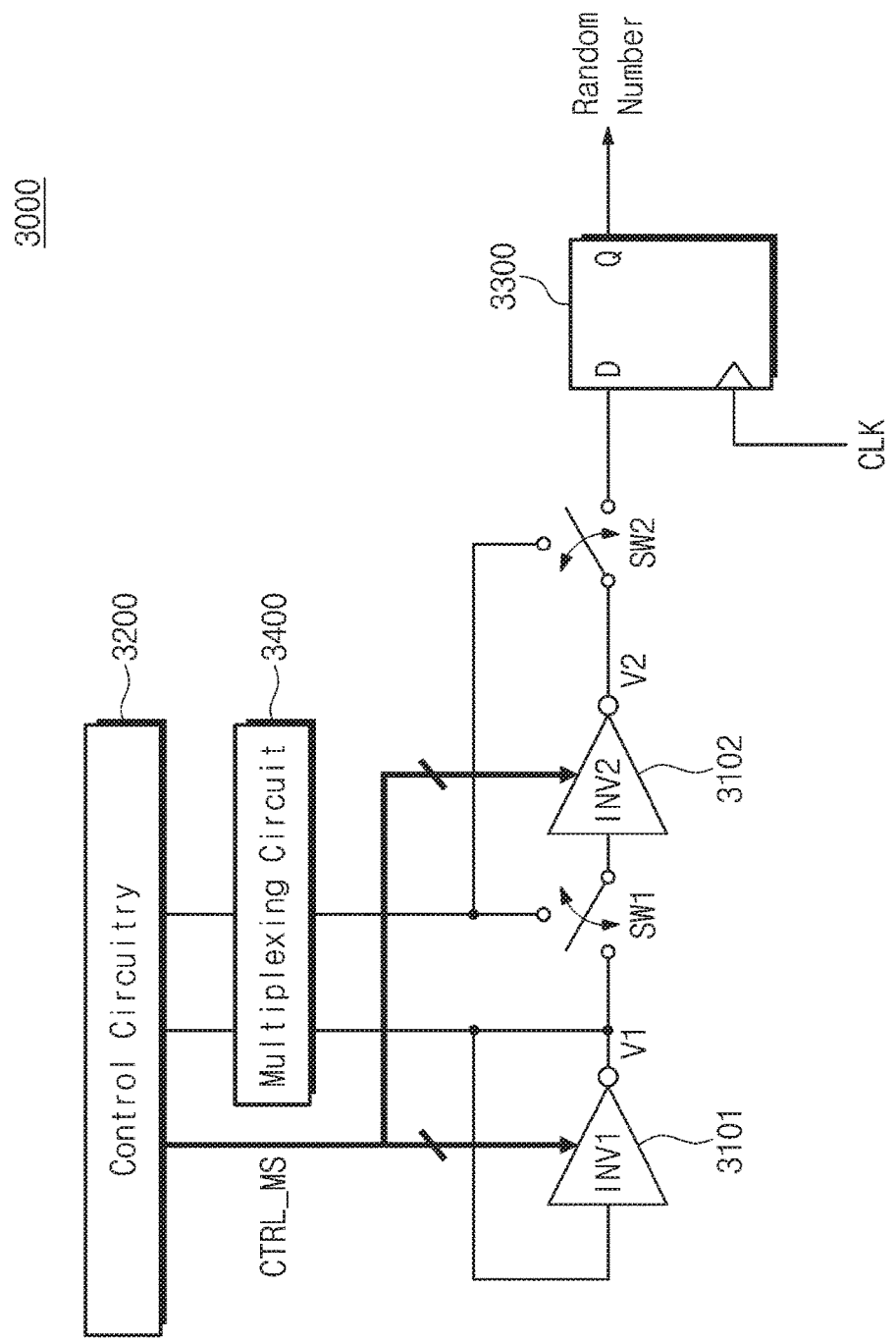
FIG. 12 is a block diagram illustrating the random number generator, according to some example embodiments of the inventive concepts.

FIG. 12 is a block diagram illustrating a random number generator 3000, according to some example embodiments of the inventive concepts. The random number generator 3000 may include a first meta-stable inverter 3101, a second meta-stable inverter 3102, a control circuitry 3200, and a sampler 3300. The random number generator 3000 may further include a multiplexing circuit 3400, a first switch SW1, and a second switch SW2.

The first meta-stable inverter 3101 may be configured to generate the meta-stable voltage V1. For example, the first meta-stable inverter 3101 may include at least one diode-connected PMOS transistor and at least one diode-connected NMOS transistor. A configuration and an operation of the first meta-stable inverter 3101 are substantially the same as those described with reference to FIG. 6A. Thus, a description thereof may not be repeated here.

The second meta-stable inverter 3102 may receive the meta-stable voltage V1 and may generate the amplified voltage V2. A configuration of the second meta-stable inverter 3102 may be substantially the same as a configuration of the first meta-stable inverter 3101. Thus, a description thereof may not be repeated here.

The control circuitry 3200 may be configured to adjust the meta-stable voltage V1 output from the first meta-stable inverter 3101, in detail, a threshold voltage of the first meta-stable inverter 3101. In addition, the control circuitry 3200 may be configured to adjust a common mode input voltage of the second meta-stable inverter 3102.

For example, the control circuitry 3200 may adjust the first and second meta-stable inverters 3101 and 3102 such that a threshold voltage of the first meta-stable inverter 3101 and the common mode input voltage of the second meta-stable inverter 3102 are the same as a preset value. For example, the control circuitry 3200 may adjust the first meta-stable inverter 3101 such that the threshold voltage of the first meta-stable inverter 3101 is the same as a preset value and may adjust the second meta-stable inverter 3102 within a permissible range in which a random number is not stuck. In this case, the control circuitry 3200 may generate a meta-stable control signal CTRL_MS for adjusting or tuning the first and second meta-stable inverters 3101 and 3102.

In some example embodiments, the control circuitry 3200 may adjust the first meta-stable inverter 3101 such that the threshold voltage of the first meta-stable inverter 3101 and the common mode input voltage of the second meta-stable inverter 3102 are the same (or are within the permissible range). The procedure may be similar to that described with reference to FIGS. 4A to 5B. In this case, the control circuitry 3200 may generate the meta-stable control signal CTRL_MS for adjusting or tuning the first meta-stable inverter 3101.

In some example embodiments, the control circuitry 3200 may adjust the second meta-stable inverter 3102 such that the threshold voltage of the first meta-stable inverter 3101 and the common mode input voltage of the second meta-stable inverter 3102 are the same (or are within the permissible range). In this case, the control circuitry 3200 may generate the meta-stable control signal CTRL_MS for adjusting or tuning the second meta-stable inverter 3102.

Unlike the embodiment described with reference to FIGS. 1 to 11, in some example embodiments, two meta-stable inverters 3101 and 3102 are adjusted or tuned. Accordingly, it may be possible to flexibly cope with an issue that a random number is stuck.

The sampler 3300 may sample the amplified voltage V2 that is input in synchronization with the sampling clock CLK. A flip-flop may be used as an example of the sampler 3300. In some example embodiments, embodiments of the inventive concepts may not be limited thereto. As well as the flip-flop, various logic elements for performing a sampling operation may be used.

The multiplexing circuit 3400 and the switches SW1 and SW2 may be appropriately switched on or off according to an operating mode of the random number generator 3000.

For example, in the first mode, the multiplexing circuit 3400 may be switched off to allow the control circuitry 3200 to fail to detect the meta-stable voltage V1. In the first mode, the first switch SW1 may be switched on to allow the second meta-stable inverter 3102 to amplify the meta-stable voltage V1. The second switch SW2 may be switched on to allow the amplified voltage V2 to be input to the sampler 3300.

In contrast, in the second mode, the multiplexing circuit 3400 may be switched on to allow the control circuitry 3200 to detect the meta-stable voltage V1 and the amplified voltage V2. In the second mode, the first switch SW1 may be controlled to allow the meta-stable voltage V1 not to be transferred to the second meta-stable inverter 3102 and the amplified voltage V2 to be input to the second meta-stable inverter 3102. In the second mode, the second switch SW2 may be controlled to allow the amplified voltage V2 not to be transferred to the sampler 3300 and the amplified voltage V2 to be input to the second meta-stable inverter 3102.

According to some example embodiments of the inventive concepts, the random number generator 3000 may operate in the first and second modes to limit and/or prevent a random number from the sampler 3300 from being stuck to one bit "0" or "1" and may adjust or tune the first and second meta-stable inverters 3101 and 3102 in the second mode.

In some example embodiments, the random number generator 3000 may further include the voltage regulator 2500 and the divider 2600 that are described with reference to FIG. 10. The random number generator 3000 may further include the amplifier 1102 (refer to FIG. 1) between the second meta-stable inverter 3102 and the sampler 3300. A detailed description thereof may not be repeated here.

Figure 13:
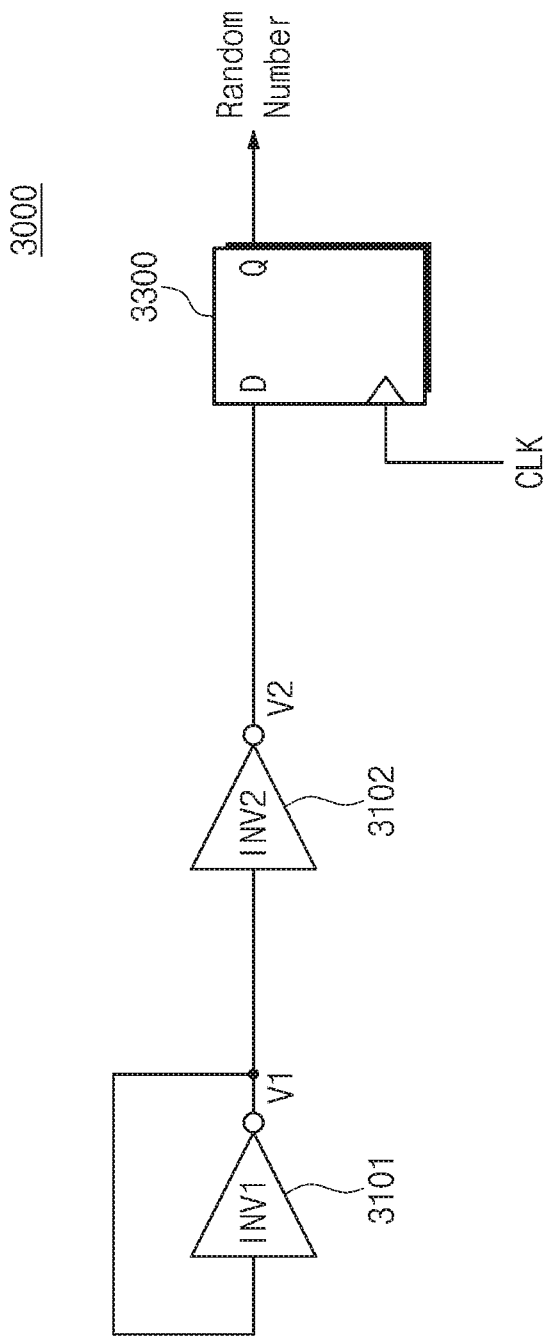
FIG. 13 is a block diagram illustrating an operation of the random number generator of FIG. 12 in a first mode.

FIG. 13 is a block diagram illustrating an operation of the random number generator 3000 of FIG. 12 in a first mode. For ease of understanding, a description will be given with reference to FIG. 12.

In the first mode, the first meta-stable inverter 3101 may generate the meta-stable voltage V1, and the second meta-stable inverter 3102 may amplify the meta-stable voltage V1. Even though a configuration of the second meta-stable inverter 3102 is different from a configuration of the amplifier 1102 illustrated in FIG. 1, the embodiment illustrated in FIG. 13 is similar to the embodiment illustrated in FIG. 2 in that the meta-stable voltage V1 is amplified. Thus, a detailed description thereof may not be repeated here.

Figure 14:
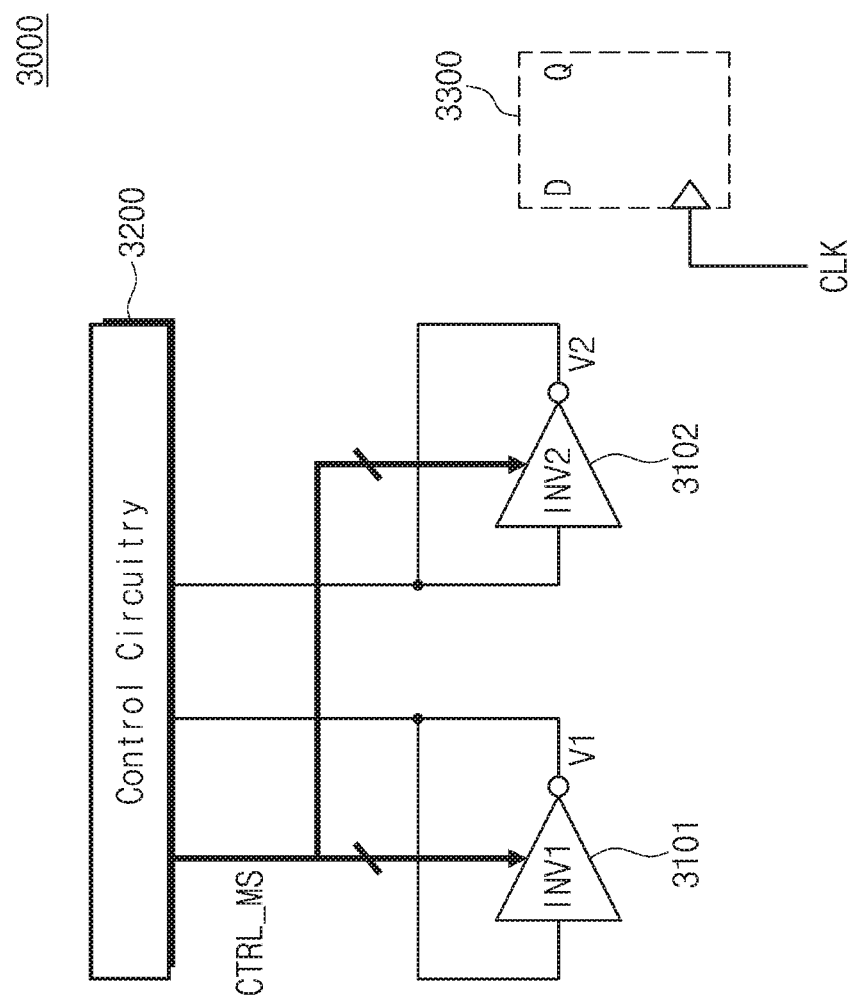
FIG. 14 is a block diagram illustrating an operation of the random number generator of FIG. 12 in a second mode.

FIG. 14 is a block diagram illustrating an operation of the random number generator 3000 of FIG. 12 in a second mode. For ease of understanding, a description will be given with reference to FIG. 12.

In the second mode, the control circuitry 3200 may detect the meta-stable voltage V1, that is, a level of a threshold voltage of the first meta-stable inverter 3101. In addition, the control circuitry 3200 may detect the amplified voltage V2, that is, a level of a common mode input voltage of the second meta-stable inverter 3102.

To detect voltages, the control circuitry 3200 may include an amplifier, an analog-to-digital converter, and meta-stable voltage control circuitry that are illustrated in FIG. 7. In some example embodiments, to detect two voltages, respectively, the control circuitry 3200 may include at least two amplifiers, at least two analog-to-digital converters, and meta-stable voltage control circuitry. A function of the control circuitry 3200 is similar to a function of the control circuitry 1200 illustrated in FIG. 7 except two voltages are detected.

The control circuitry 3200 may match the first meta-stable inverter 3101 and the second meta-stable inverter 3102 such that the voltage V2 amplified from the meta-stable voltage V1 is not stuck. For example, the control circuitry 3200 may adjust at least one of the first and second meta-stable inverters 3101 and 3102 such that a threshold voltage of the first meta-stable inverter 3101 and the common mode input voltage of the second meta-stable inverter 3102 are the same.

In some example embodiments, the control circuitry 3200 may control at least one of the first and second meta-stable inverters 3101 and 3102 such that the common mode input voltage of the second meta-stable inverter 3102 is between the upper limit and the lower limit of the meta-stable voltage V1.

If at least one of the first and second meta-stable inverters 3101 and 3102 is completely adjusted or tuned in the second mode, under control of the multiplexing circuit 3400, the output terminal of the first meta-stable inverter 3101 and the control circuitry 3200 are disconnected from each other, and the output terminal of the first meta-stable inverter 3101 and the second meta-stable inverter 3102 are connected to each other. This may mean that the random number generator 3000 enters the first mode again.

Figure 15A:
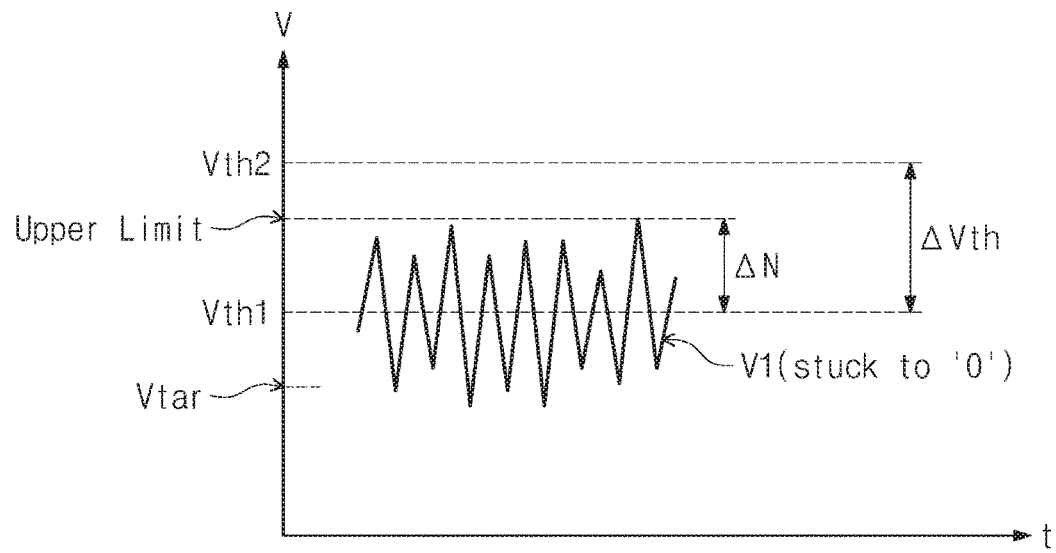
FIGS. 15A to 15D are graphs for showing a process of correcting a stuck random number by using the random number generator, according to some example embodiments of the inventive concepts.
Figure 15B:
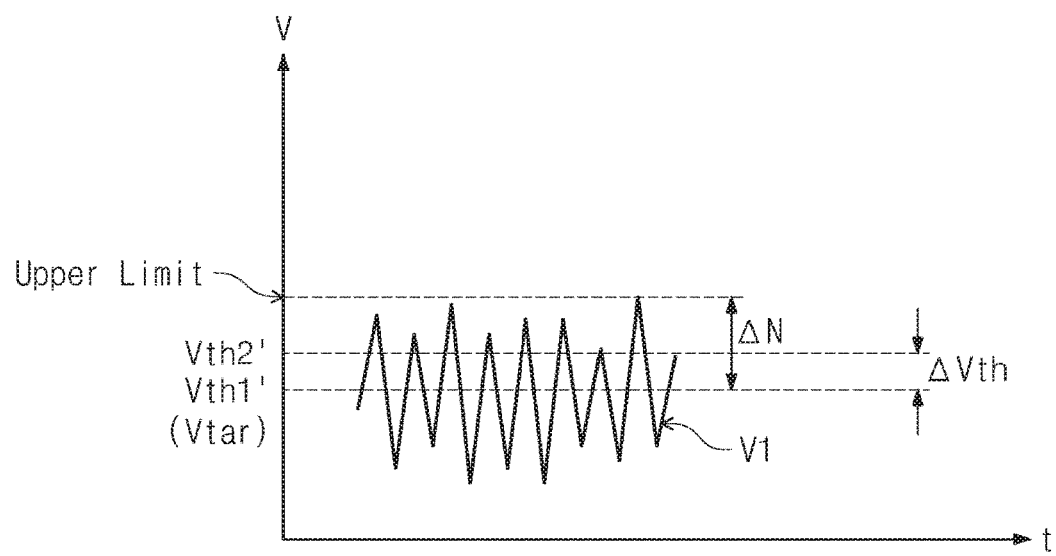
Figure 15C:
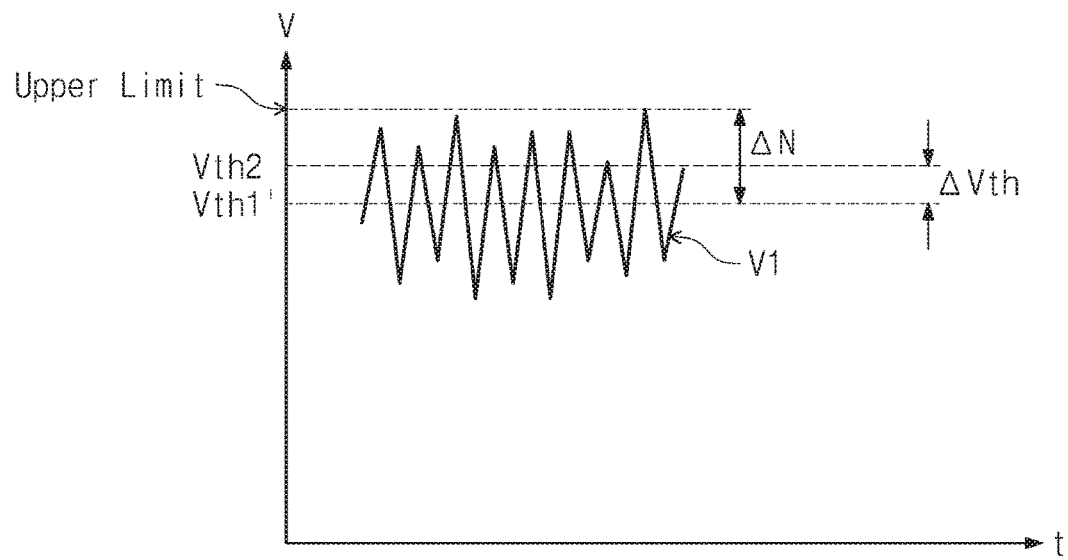
Figure 15D:
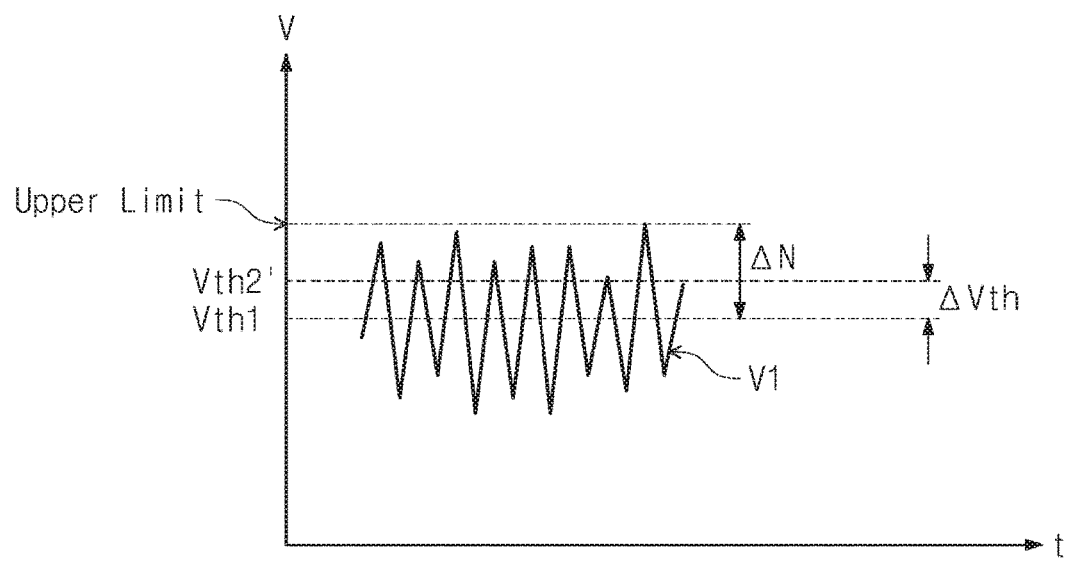

FIGS. 15A to 15D are graphs for showing a process of correcting a stuck random number by using a random number generator, according to some example embodiments of the inventive concepts. For example, FIG. 15A illustrates the case where a random number output from a random number generator is stuck, and FIGS. 15B to 15D illustrate the case where a stuck random number is corrected by using the random number generator. For ease of understanding, a description will be given with reference to FIGS. 12 to 14.

First, referring to FIG. 15A, the meta-stable voltage V1 output from the first meta-stable inverter 3101 oscillates vertically with respect to the threshold voltage Vth1. A target voltage Vtar illustrated in a drawing indicates the adjusted or tuned meta-stable voltage V1. It is assumed that the upper limit of the meta-stable voltage V1 is defined by a sum of the threshold voltage Vth1 and ΔN and the lower limit of the meta-stable voltage V1 is defined by a difference between the threshold voltage Vth1 and ΔN. In FIG. 15A, since the upper limit of the meta-stable voltage V1 is smaller than the common mode input voltage of the second meta-stable inverter 3102, a random number may be stuck. This is similar to that described with reference to FIG. 4A, and thus, a detailed description thereof may be omitted.

FIG. 15B shows the case where the first meta-stable inverter 3101 and the second meta-stable inverter 3102 are all adjusted.

As the first meta-stable inverter 3101 is adjusted or tuned under control of the meta-stable control signal CTRL_MS, the first meta-stable inverter 3101 may generate the meta-stable voltage V1 that vertically oscillates with respect to the adjusted threshold voltage Vth1 or the target voltage Vtar. The adjustment of the threshold voltage Vth1 of the first meta-stable inverter 3101 may be made to be similar to that described with reference to FIG. 6A. In some example embodiments, if only the first meta-stable inverter 3101 is adjusted, a random number output from the random number generator 3000 may be still stuck. Accordingly, there is a need to adjust the second meta-stable inverter 3102.

As the second meta-stable inverter 3102 is adjusted or tuned under control of the meta-stable control signal CTRL_MS, a common mode input voltage Vth2' of the second meta-stable inverter 3102 may be between the upper limit and the lower limit of the metal-stable voltage V1. A random number of "1" may be generated based on the meta-stable voltage V1 larger than the common mode input voltage Vth2', and a random number of "0" may be generated based on the meta-stable voltage V1 smaller than the common mode input voltage Vth2' (or vice versa).

FIG. 15C shows the case where the first meta-stable inverter 3101 is adjusted. In some example embodiments, the first meta-stable inverter 3101 may be adjusted or tuned such that the threshold voltage Vth1' of the first meta-stable inverter 3101 is within a permissible range. In some example embodiments, since the permissible range is a range in which a random number is not stuck, the upper limit of the meta-stable voltage V1 may be larger than the common mode input voltage Vth2, and the lower limit of the meta-stable voltage V1 may be smaller than the common mode input voltage Vth2.

Even though the meta-stable inverters 3101 and 3102 are the same in configuration, the embodiment is similar to that described with reference to FIG. 4B in that only the first meta-stable inverter 3101 is adjusted or tuned. Thus, a detailed description thereof may not be repeated here.

FIG. 15D shows the case where the second meta-stable inverter 3102 is adjusted. In some example embodiments, the second meta-stable inverter 3102 may be adjusted or tuned such that the common mode input voltage Vth2' of the second meta-stable inverter 3102 is within a permissible range. In some example embodiments, since the permissible range is a range in which a random number is not stuck, the common mode input voltage Vth2' of the second meta-stable inverter 3102 may be between the upper limit and the lower limit of the meta-stable voltage Vth1.

Figure 16:
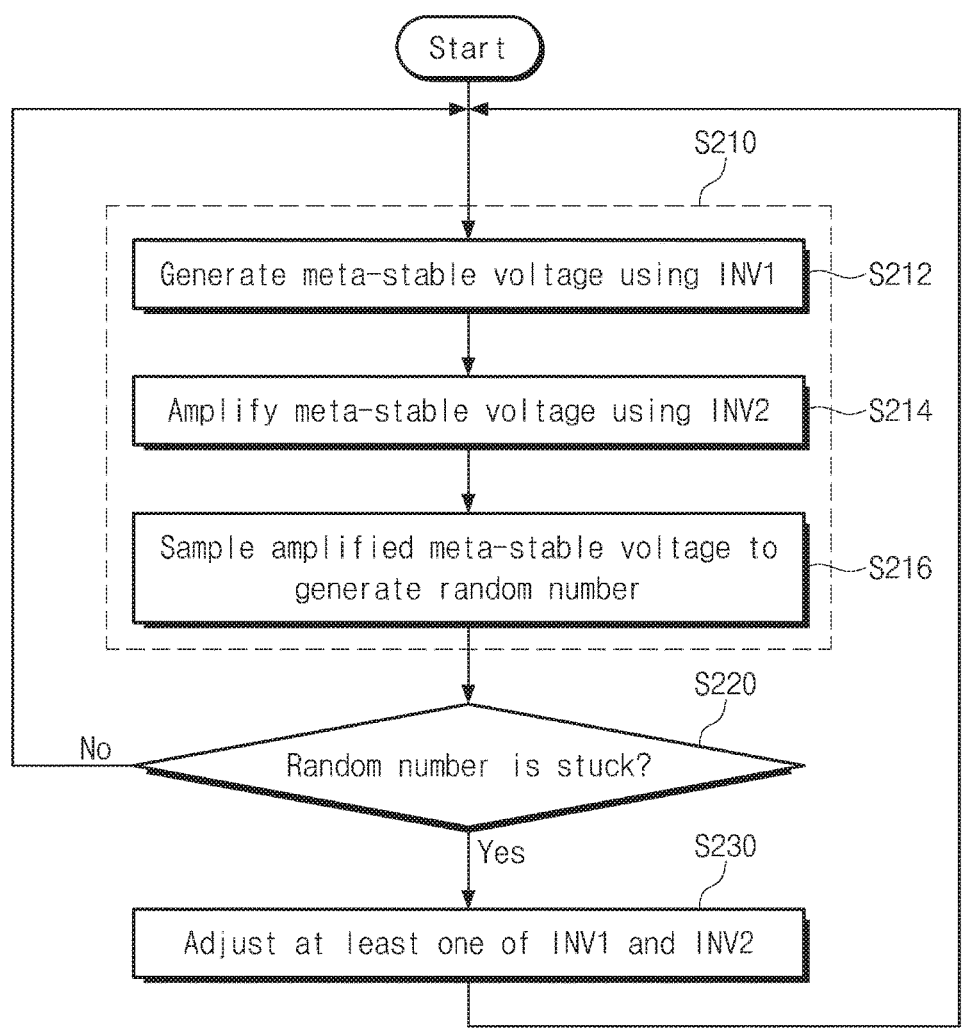
FIG. 16 is a flowchart illustrating an operating method of the random number generator, according to some example embodiments of the inventive concepts.

FIG. 16 is a flowchart illustrating an operating method of a random number generator, according to some example embodiments of the inventive concepts. For ease of understanding, a description will be given with reference to FIGS. 12 to 15D.

In operation S210, a random number may be generated. Operation S210 may correspond to an operation of the random number generator 3000 in the first mode.

In operation S212, a meta-stable voltage may be generated by using the first meta-stable inverter (INV1) 3101. A noise that vertically oscillates with respect to the threshold voltage Vth1 may be output from the first meta-stable inverter 3101 based on a resistance ratio of the diode-connected PMOS transistors and the diode-connected NMOS transistors.

In operation S214, the meta-stable voltage V1 may be amplified by the second meta-stable inverter (INV2) 3102. The first switch SW1 may be appropriately switched to amplify the meta-stable voltage V1. A configuration of the second meta-stable inverter 3102 may be substantially the same as a configuration of the meta-stable inverter 1101.

In operation S216, the amplified voltage V2 that is input in synchronization with the sampling clock CLK may be sampled. The second switch SW2 may be appropriately switched to sample the amplified voltage V2. A random number may be generated as the sampling result.

In operation S220, it may be determined whether a random number is stuck. For example, operation S220 may be performed in real time or periodically. That the random number is not stuck (No) means that the random number is generated normally. Therefore, operation S210 may be continuously performed until a separate instruction to stop generating a random number is received. In contrast, if it is determined that the random number is stuck (Yes), the process proceeds to operation S230.

In operation S230, at least one of the first meta-stable inverter (INV1) 3101 and the second meta-stable inverter (INV2) 3102 may be adjusted or tuned.

Figure 17:
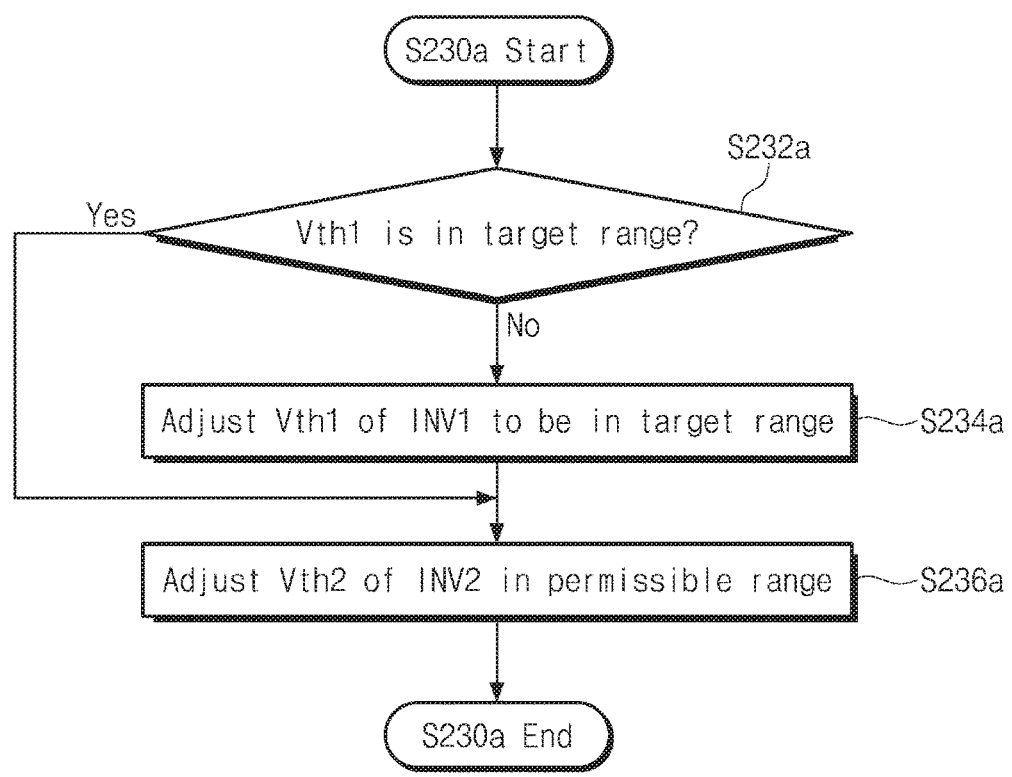
FIG. 17 is a flowchart illustrating operation S230 of FIG. 16 in detail according to some example embodiments.

FIG. 17 is a flowchart illustrating operation S230 of FIG. 16 in detail according to some example embodiments. For ease of understanding, a description will be given with reference to FIGS. 12 and 15B.

In operation S232a, whether the threshold voltage Vth1 of the first meta-stable inverter 3101 is within a permissible range may be determined. The threshold voltage Vth1 and the common mode input voltage Vth2 may be first detected for comparison. Even though the term "target range" is used in FIG. 17, the target range may be a fixed value, not a range value. For example, the control circuitry 3200 may compare the meta-stable voltage Vth1 output from the first meta-stable inverter 3101 with a preset value in the second mode.

An operation branch may be made according to the determination result. In contrast, if the meta-stable voltage Vth1 is within the target range of voltages, the process proceeds to operation S236a. That a random number may be stuck even though the meta-stable voltage Vth1 is within the target range means that the common mode input voltage Vth2 of the second meta-stable inverter 3102 gets out of the permissible range. In contrast, if the meta-stable voltage Vth1 gets out of the target range, the process proceeds to operation S234a.

In operation S234a, the first meta-stable inverter (INV1) 3101 may be adjusted or tuned such that the threshold voltage Vth1 of the first meta-stable inverter (INV1) 3101 is within the target range. This may be accomplished by independently controlling switching transistors that are respectively connected with the diode-connected PMOS transistors and the diode-connected NMOS transistors of the first meta-stable inverter 3101 (refer to FIG. 6A). This operation may correspond to make the threshold voltage Vth1 and the target voltage Vtar coincide with each other as illustrated in FIG. 15B.

In operation S236a, the common mode input voltage Vth2 of the second meta-stable inverter (INV2) 3102 may be adjusted within the permissible range. As illustrated in FIG. 15B, the common mode input voltage Vth2 may be between the upper limit and the lower limit of the adjusted meta-stable voltage Vth1'.

Figure 18:
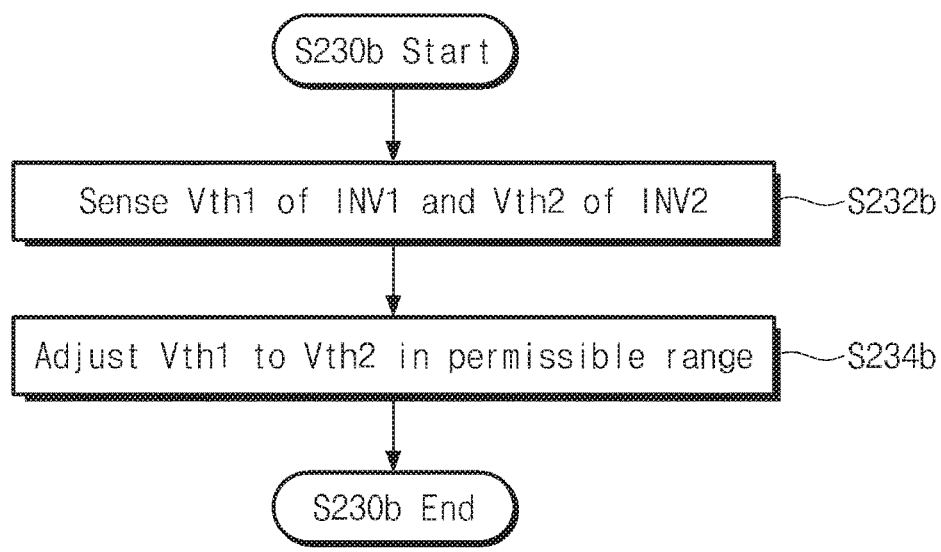
FIG. 18 is a flowchart illustrating operation S230 of FIG. 16 in detail according to some example embodiments.

FIG. 18 is a flowchart illustrating operation S230 of FIG. 16 in detail according to some example embodiments. For ease of understanding, a description will be given with reference to FIGS. 12 and 15C.

In operation S232b, a level of the threshold voltage Vth1 of the first meta-stable inverter (INV1) 3101 and a level of the common mode input voltage Vth2 of the second meta-stable inverter (INV2) 3102 may be detected.

In operation S234b, the first meta-stable inverter (INV1) 3101 may be adjusted such that the threshold voltage Vth1 is within the permissible range. In some example embodiments, since the permissible range is a range in which a random number is not stuck, the upper limit of the meta-stable voltage V1 that oscillates with respect to the threshold voltage Vth1 may be larger than the common mode input voltage Vth2, and the lower limit of the meta-stable voltage V1 may be smaller than the common mode input voltage Vth2.

In addition, in some example embodiments, since the first meta-stable inverter (INV1) 3101 is adjusted based on the common mode input voltage Vth2, there is no need for information associated with the target voltage Vtar illustrated in FIG. 15A.

Figure 19:
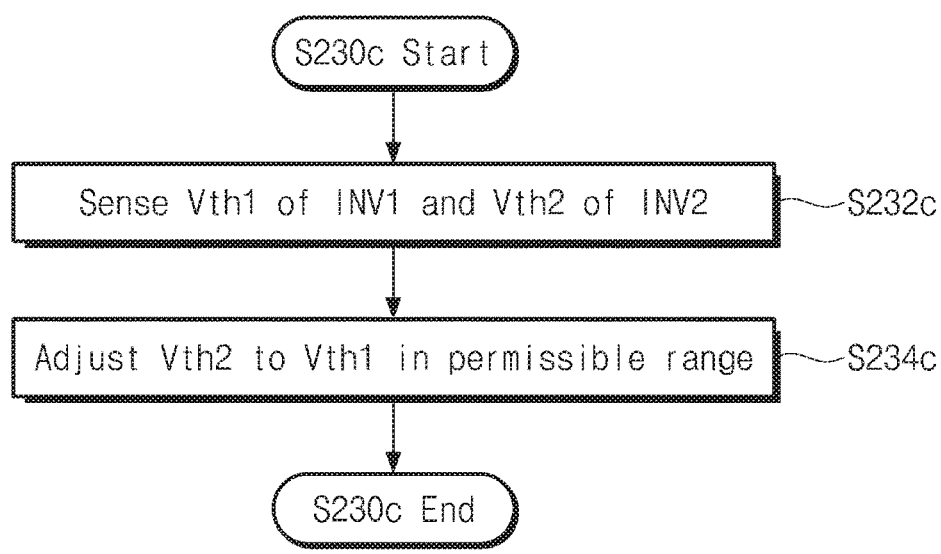
FIG. 19 is a flowchart illustrating operation S230 of FIG. 16 in detail according to some example embodiments.

FIG. 19 is a flowchart illustrating operation S230 of FIG. 16 in detail according to some example embodiments. For ease of understanding, a description will be given with reference to FIGS. 12 and 15D.

In operation S232c, a level of the threshold voltage Vth1 of the first meta-stable inverter (INV1) 3101 and a level of the common mode input voltage Vth2 of the second meta-stable inverter (INV2) 3102 may be detected.

In operation S234c, the second meta-stable inverter (INV2) 3102 may be adjusted such that the common mode input voltage Vth2 is within the permissible range. In some example embodiments, since the permissible range is a range in which a random number is not stuck, the common mode input voltage Vth2' of the second meta-stable inverter 3102 may be between the upper limit and the lower limit of the meta-stable voltage Vth1.

Figure 20:
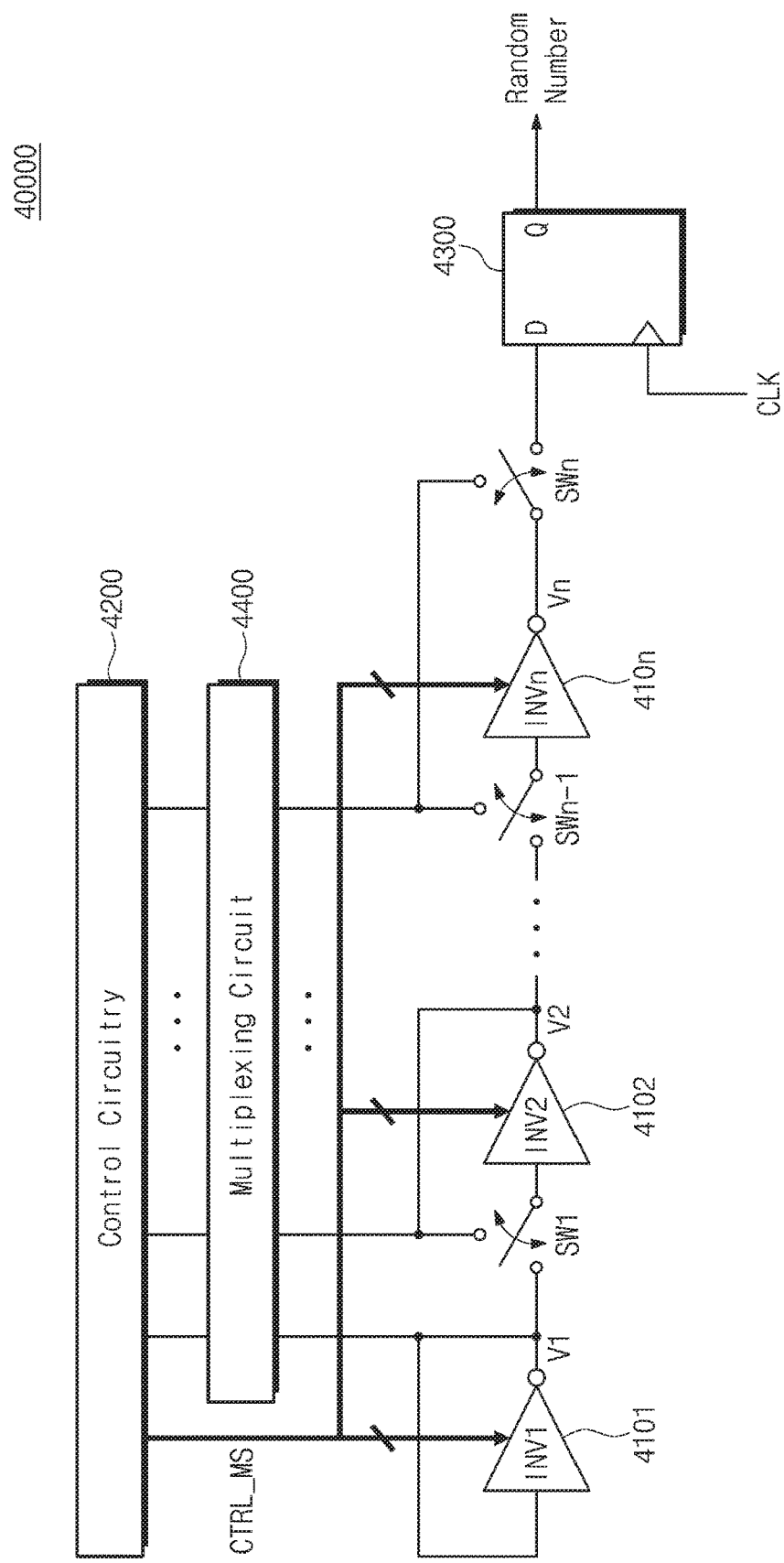
FIG. 20 is a block diagram illustrating a random number generator, according to some example embodiments of the inventive concepts.

FIG. 20 is a block diagram illustrating a random number generator 4000, according to some example embodiments of the inventive concepts. The random number generator 4000 may include first to n-th meta-stable inverters 4101 to 410n, a control circuitry 4200, and a sampler 4300. The random number generator 4000 may further include a multiplexing circuit 4400 and first to n-th switches SW1 to SWn. Although not illustrated in FIG. 20, the random number generator 4000 may further include the voltage regulator 2500 and the divider 2600 that are described with reference to FIG. 10.

The first to n-th meta-stable inverters 4101 to 410n may have the same configuration. For example, each meta-stable inverter may include diode-connected PMOS transistors ("output terminal-connected PMOS transistors"), diode-connected NMOS transistors ("output terminal-connected NMOS transistors"), switching transistors respectively connected with the PMOS and NMOS transistors, and a decoder configured to control the switching transistors (refer to FIG. 6A).

In the first mode, the first meta-stable inverter 4101 may operate as a source for generating the meta-stable voltage V1, and each of the second to n-th meta-stable inverters 4102 to 410n may operate as an amplifier for amplifying an output of a previous stage. To this end, the switches SW1 to SWn may be appropriately switched such that meta-stable inverters of front and rear stages are connected to each other.

In the second mode, a threshold voltage of the first meta-stable inverter 4101 (i.e., a voltage that the meta-stable voltage V1 oscillates with the center as) may be detected. A common mode input voltage of each of the second to n-th meta-stable inverters 4102 to 410n may be also detected by the control circuitry 4200. To this end, of course, the multiplexing circuit 4400 and the switches SW1 to SWn may be appropriately switched.

For example, the control circuitry 4200 may adjust common mode input voltages Vth2 to Vthn within a permissible range while setting the threshold voltage Vth1 to a preset value. In some example embodiments, the common mode input voltages Vth2 to Vthn may correspond to the meta-stable inverters 4102 to 410n, respectively.

In some example embodiments, the control circuitry 4200 may adjust or tune the second to n-th meta-stable inverters 4102 to 410n based on the threshold voltage Vth1 of the first meta-stable inverter 4101.

In some example embodiments, the control circuitry 4200 may adjust or tune the first and third to n-th meta-stable inverters 4101 and 4103 to 410n based on the common mode input voltage Vth2 of the second meta-stable inverter 4102. That is, it may be possible to use a common mode input voltage of any of the second to n-th meta-stable inverters 4102 to 410n as a reference for tuning or adjusting.

Figure 21:
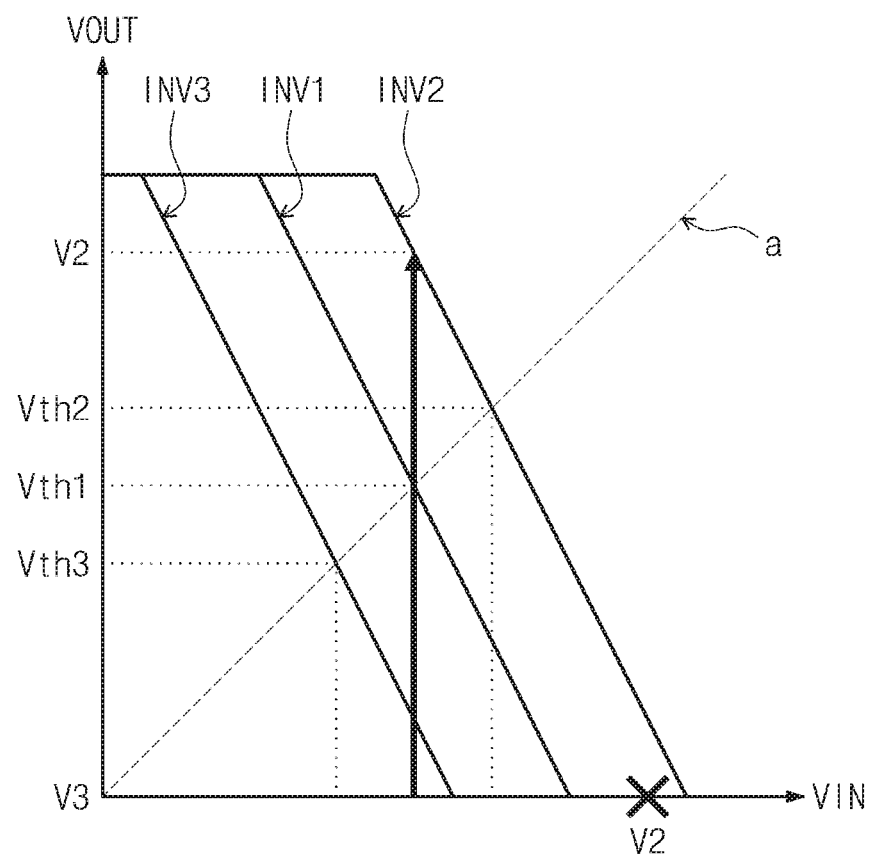
FIG. 21 shows the case where a random number generated by the random number generator illustrated in FIG. 20 is stuck.

FIG. 21 shows the case where a random number generated by the random number generator 4000 illustrated in FIG. 20 is stuck. That is, FIG. 21 shows a characteristic curve of meta-stable inverters when adjustment or tuning of the random number generator 4000 is not made. For ease of understanding, a description will be given with reference to FIG. 20. In some example embodiments, it is assumed that the number of meta-stable inverters is "3" (i.e., n=3).

A graph indicated by "INV1" refers to an input/output graph of the first meta-stable inverter 4101. A graph indicated by "INV2" refers to an input/output graph of the second meta-stable inverter 4102. A graph indicated by "INV3" refers to an input/output graph of the third meta-stable inverter 4103.

If voltages that are distributed on an upper side with respect to a dotted line indicated by "a" are input, "1" may be output; if voltages that are distributed on a lower side with respect to the dotted line indicated by "a" are input, "0" may be output. That is, an intersection of the graph indicated by "INV1" and the graph indicated by "a" may be understood as the threshold voltage Vth1 of the first meta-stable inverter INV1. As in the above description, an intersection of the graph indicated by "INV2" and the graph indicated by "a" may be understood as the common mode input voltage Vth2 of the second meta-stable inverter INV2. An intersection of the graph indicated by "INV3" and the graph indicated by "a" may be understood as the common mode input voltage Vth3 of the third meta-stable inverter INV3.

For a brief description, it is assumed that a voltage output from the first meta-stable inverter INV1 is "Vth1". Actually, of course, the voltage output from the first meta-stable inverter INV1 may be a noise that oscillates with respect to the threshold voltage Vth1. "Vth1" may be input to the second meta-stable inverter INV2, and thus, the second meta-stable inverter INV2 may output "V2". Next, "V2" may be input to the third meta-stable inverter INV3, and thus, the third meta-stable inverter INV3 may output "V2". That is, since the first to third meta-stable inverters INV1 to INV3 are not matched with each other, a random number may be stuck.

Figure 22:
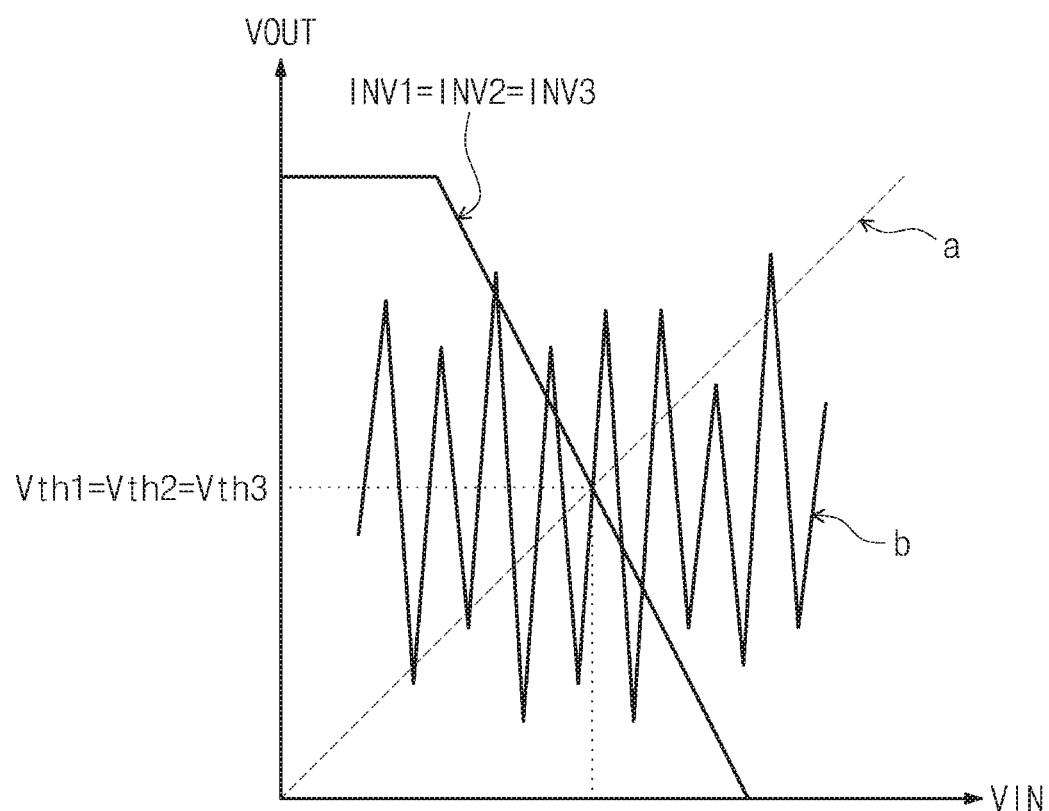
FIG. 22 shows the case where a random number that is not stuck according to an operation of the random number generator illustrated in FIG. 20 is generated.

FIG. 22 shows the case where a random number that is not stuck according to an operation of the random number generator illustrated in FIG. 20 is generated.

FIG. 22 shows the case where the threshold voltage Vth1 of the first meta-stable inverter INV1, the common mode input voltage Vth2 of the second meta-stable inverter INV2, and the common mode input voltage Vth3 of the third meta-stable inverter INV3 coincide with each other. In the case of a permissible range in which a random number is not stuck, of course, the threshold voltage Vth1, the common mode input voltage Vth2, and the common mode input voltage Vth3 may not coincide with each other.

As illustrated in FIG. 22, it is understood from a graph indicated by "b" that an amplified voltage output from the third meta-stable inverter INV3 oscillates with respect to the voltage Vth3. The graph "b" corresponding to the amplified voltage may be finally sampled by a sampler, and thus, a random number may be generated.

According to some example embodiments of the inventive concepts, it may be possible to generate a random number by using an adjustable meta-stable voltage.

In addition, according to some example embodiments of the inventive concepts, it may be possible to improve a random number generation speed and to generate a high-quality random number that is not stuck to a specific value.

While the inventive concepts have been described with reference to exemplary embodiments, it will be apparent to those skilled in the art that various changes and modifications may be made without departing from the spirit and scope of the inventive concepts. Therefore, it should be understood that the above embodiments are not limiting, but illustrative.

What is claimed is:

1. A random number generator configured to be operated according to different modes of operation of a plurality of modes of operation, the random number generator comprising:
    a first meta-stable inverter including an input terminal and an output terminal, the input terminal and the output terminal connected to each other, the first meta-stable inverter configured to generate a meta-stable voltage;
    a second meta-stable inverter configured to amplify the meta-stable voltage according to a first mode of operation and include an input terminal and an output terminal that are connected to each other according to a second mode of operation, respectively, of the plurality of modes of operation;
    control circuitry configured to adjust at least one voltage of a threshold voltage associated with the first meta-stable inverter and a common mode input voltage associated with the second meta-stable inverter, the meta-stable voltage being based on the threshold voltage and the common mode input voltage; and
    a sampler configured to generate a random number based on sampling the meta-stable voltage.

2. The random number generator of claim 1, wherein in the first mode of operation, the sampler is configured to generate the random number based on sampling the amplified meta-stable voltage.

3. The random number generator of claim 1, wherein in the second mode of operation, the control circuitry is configured to:
    control the first meta-stable inverter such that the threshold voltage is a target voltage, and
    control the second meta-stable inverter such that the common mode input voltage is between an upper limit and a lower limit of the meta-stable voltage.

4. The random number generator of claim 1, wherein in the second mode of operation, the control circuitry is configured to control the first meta-stable inverter such that an upper limit of the meta-stable voltage is larger than the common mode input voltage and a lower limit of the meta-stable voltage is smaller than the common mode input voltage.

5. The random number generator of claim 1, wherein in the second mode of operation, the control circuitry is configured to control the second meta-stable inverter such that the common mode input voltage is between an upper limit and a lower limit of the meta-stable voltage.

6. The random number generator of claim 1, wherein the control circuitry includes,
    a voltage follower configured to receive at least one voltage of the meta-stable voltage and an output voltage of the second meta-stable inverter of which the input terminal and the output terminal connected to each other;
    an analog-to-digital converter configured to generate at least one digital value based on an output of the voltage follower; and
    meta-stable voltage control circuitry configured to determine whether to control the first or second meta-stable inverter based on the at least one digital value.

7. The random number generator of claim 1, wherein the first meta-stable inverter includes,
    at least one PMOS transistor including a gate electrode and a drain electrode that are each connected to the output terminal;
    at least one NMOS transistor including a gate electrode and a drain electrode that are each connected to the output terminal;
    at least one PMOS switching transistor connected between a power supply voltage and a source electrode of the at least one PMOS transistor;
    at least one NMOS switching transistor connected between a source electrode of the at least one NMOS transistor and a ground voltage; and
    a decoder configured to control the at least one PMOS switching transistor and the at least one NMOS switching transistor independently.

8. The random number generator of claim 7, wherein the second meta-stable inverter and the first meta-stable inverter have a common configuration of at least one output terminal-connected PMOS transistor, at least one output terminal-connected NMOS transistor, at least one PMOS switching transistor connected with the PMOS transistor, at least one NMOS switching transistor connected with the NMOS transistor, and a decoder configured to control the at least one PMOS switching transistor and the at least one NMOS switching transistor independently.

9. The random number generator of claim 1, further comprising:
a multiplexing circuit configured to:
connect the output terminal of the first meta-stable inverter to the second meta-stable inverter in the first mode of operation, or
connect the output terminal of the first meta-stable inverter to the control circuitry in the second mode of operation.

10. A random number generator comprising:
a meta-stable inverter including an input terminal and an output terminal connected to each other, the meta-stable inverter configured to generate a meta-stable voltage;
an amplifier configured to amplify the meta-stable voltage;
control circuitry configured to adjust a threshold voltage of the meta-stable voltage based on a common mode input voltage of the amplifier, the threshold voltage of the meta-stable voltage being a base of the meta-stable voltage; and
a sampler configured to generate a random number based on sampling the meta-stable voltage.

11. The random number generator of claim 10, wherein,
the random number generator is configured to be operated according to different modes of a plurality of modes of operation, and
the amplifier is configured to amplify the meta-stable voltage in an amplification mode of the plurality of modes of operation, and
the sampler is configured to generate the random number based on sampling the amplified meta-stable voltage.

12. The random number generator of claim 10, wherein,
the random number generator is configured to be operated according to different modes of a plurality of modes of operation,
the control circuitry is configured to control the meta-stable inverter in a sensing mode of the plurality of modes of operation such that an upper limit of the meta-stable voltage is larger than the common mode input voltage of the amplifier and a lower limit of the meta-stable voltage is smaller than the common mode input voltage.

13. The random number generator of claim 10, wherein the meta-stable inverter includes
at least one PMOS transistor including a gate electrode and a drain electrode that are each connected to the output terminal;
at least one NMOS transistor including a gate electrode and a drain electrode that are each connected to the output terminal;
at least one PMOS switching transistor connected between a power supply voltage and a source electrode of the at least one PMOS transistor;
at least one NMOS switching transistor connected between a source electrode of the at least one NMOS transistor and a ground voltage; and
a decoder configured to control the at least one PMOS switching transistor and the at least one NMOS switching transistor independently.

14. A random number generator, comprising:
a memory storing a program of instructions; and
a processor configured to execute the program of instructions to:
generate a first meta-stable voltage by a first meta-stable inverter,
amplify the first meta-stable voltage by an amplifier,
adjust a threshold voltage of the first meta-stable voltage based on a common mode input voltage of the amplifier, the first meta-stable voltage based on at least the threshold voltage, and
generate a random number based on sampling the first meta-stable voltage.

15. The random number generator of claim 14, wherein,
the processor is configured to execute the program of instructions to control the first meta-stable inverter such that an upper limit of the first meta-stable voltage is larger than the common mode input voltage of the amplifier configured to amplify the first meta-stable voltage and a lower limit of the first meta-stable voltage is smaller than the common mode input voltage.

16. The random number generator of claim 14, wherein,
the processor is configured to execute the program of instructions to adjust at least one of the threshold voltage and the common mode input voltage associated with the amplifier,
wherein the amplifier comprises a second meta-stable inverter configured to amplify the first meta-stable voltage, to generate a second meta-stable voltage based on the threshold voltage and the common mode input voltage, in a first mode of operation, and
the second meta-stable inverter includes an input terminal and an output terminal that are configured to be connected to each other in a second mode of operation.

17. The random number generator of claim 16, wherein,
the processor is configured to execute the program of instructions to, based on the random number generator being operated according to the second mode of operation,
control the first meta-stable inverter such that the threshold voltage is a target voltage, and
control the second meta-stable inverter such that the common mode input voltage is between an upper limit and a lower limit of the first meta-stable voltage.

18. The random number generator of claim 16, wherein,
the processor is configured to execute the program of instructions to, based on the random number generator being operated according to the second mode of operation, control the first meta-stable inverter such that an upper limit of the first meta-stable voltage is larger than the common mode input voltage and a lower limit of the first meta-stable voltage is smaller than the common mode input voltage.

19. The random number generator of claim 16, wherein,
the processor is configured to execute the program of instructions to, based on the random number generator being operated according to the second mode of operation, control the second meta-stable inverter such that the common mode input voltage is between an upper limit and a lower limit of the first meta-stable voltage.

20. The random number generator of claim 16, wherein the processor is configured to execute the program of instructions to determine whether to control the first meta-stable inverter or the second meta-stable inverter, based on at least one digital value, the digital value is generated based on an output of a voltage follower, the voltage follower is configured to receive at least one voltage of the first meta-stable voltage and an output voltage of the second meta-stable inverter.

* * * * *